US012561000B2

(12) United States Patent
Kojima et al.

(10) Patent No.: US 12,561,000 B2
(45) Date of Patent: Feb. 24, 2026

(54) ALERT DISPLAY SYSTEM, ALERT DISPLAY METHOD, AND ALERT DISPLAY PROGRAM

(71) Applicant: DWANGO CO., LTD., Tokyo (JP)

(72) Inventors: Takashi Kojima, Tokyo (JP); Yuri Odagiri, Tokyo (JP); Akihiko Koizuka, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 0 days.

(21) Appl. No.: 18/689,558

(22) PCT Filed: Nov. 14, 2022

(86) PCT No.: PCT/JP2022/042275
§ 371 (c)(1),
(2) Date: Mar. 6, 2024

(87) PCT Pub. No.: WO2023/100637
PCT Pub. Date: Jun. 8, 2023

(65) Prior Publication Data
US 2024/0361836 A1     Oct. 31, 2024

(30) Foreign Application Priority Data

Nov. 30, 2021     (JP) ................................. 2021-194644

(51) Int. Cl.
*G06F 3/01*        (2006.01)
*G06F 3/14*        (2006.01)
(52) U.S. Cl.
CPC ............ *G06F 3/013* (2013.01); *G06F 3/1423* (2013.01)

(58) Field of Classification Search
None
See application file for complete search history.

(56) References Cited

U.S. PATENT DOCUMENTS

| | | | |
|---|---|---|---|
| 11,836,328 B1* | 12/2023 | Olliphant ............... | G06V 40/20 |
| 2014/0009395 A1* | 1/2014 | Ku ........................... | G06F 3/013 |
| | | | 345/157 |
| 2016/0350977 A1* | 12/2016 | Doronichev ............ | H04W 4/21 |

FOREIGN PATENT DOCUMENTS

| | | |
|---|---|---|
| JP | 2005-278938 A | 10/2005 |
| JP | 2012-529223 A | 11/2012 |
| JP | 2013-203103 A | 10/2013 |
| JP | 2014-146871 A | 8/2014 |
| JP | 2015-134521 A | 7/2015 |
| JP | 2017-224313 A | 12/2017 |
| JP | 2020-502491 A | 1/2020 |

(Continued)

OTHER PUBLICATIONS

International Search Report dated Dec. 13, 2022, in corresponding International Application No. PCT/JP2022/042275; 11 pages.

(Continued)

*Primary Examiner* — Carl Adams
(74) *Attorney, Agent, or Firm* — Maier & Maier, PLLC

(57)     ABSTRACT

An alert display system includes at least one processor. The at least one processor displays an alert on a display device of a user terminal, detects the line of sight of a user of the user terminal, acquires user viewpoint coordinates on the display device, and changes a display form of the alert on the basis of the viewpoint coordinates and area coordinates of the alert on the display device.

12 Claims, 16 Drawing Sheets

(56)          References Cited

FOREIGN PATENT DOCUMENTS

| WO | 2014/192103 | A1 | 12/2014 |
| WO | 2015/029554 | A1 | 3/2015 |

OTHER PUBLICATIONS

Japanese Office Action issued on Feb. 8, 2022, in corresponding Japanese application No. 2021-194644; 6 pgs.
Japanese Office Action issued on Apr. 4, 2023, in corresponding Japanese application No. 2021-194644; 15 pgs.
Decision on Refusal issued on Jul. 5, 2022, in corresponding Japanese application No. 2021-194644; 6 pgs.

* cited by examiner

WARNING!
BATTERY IS RUNNING OUT

Figure 12:
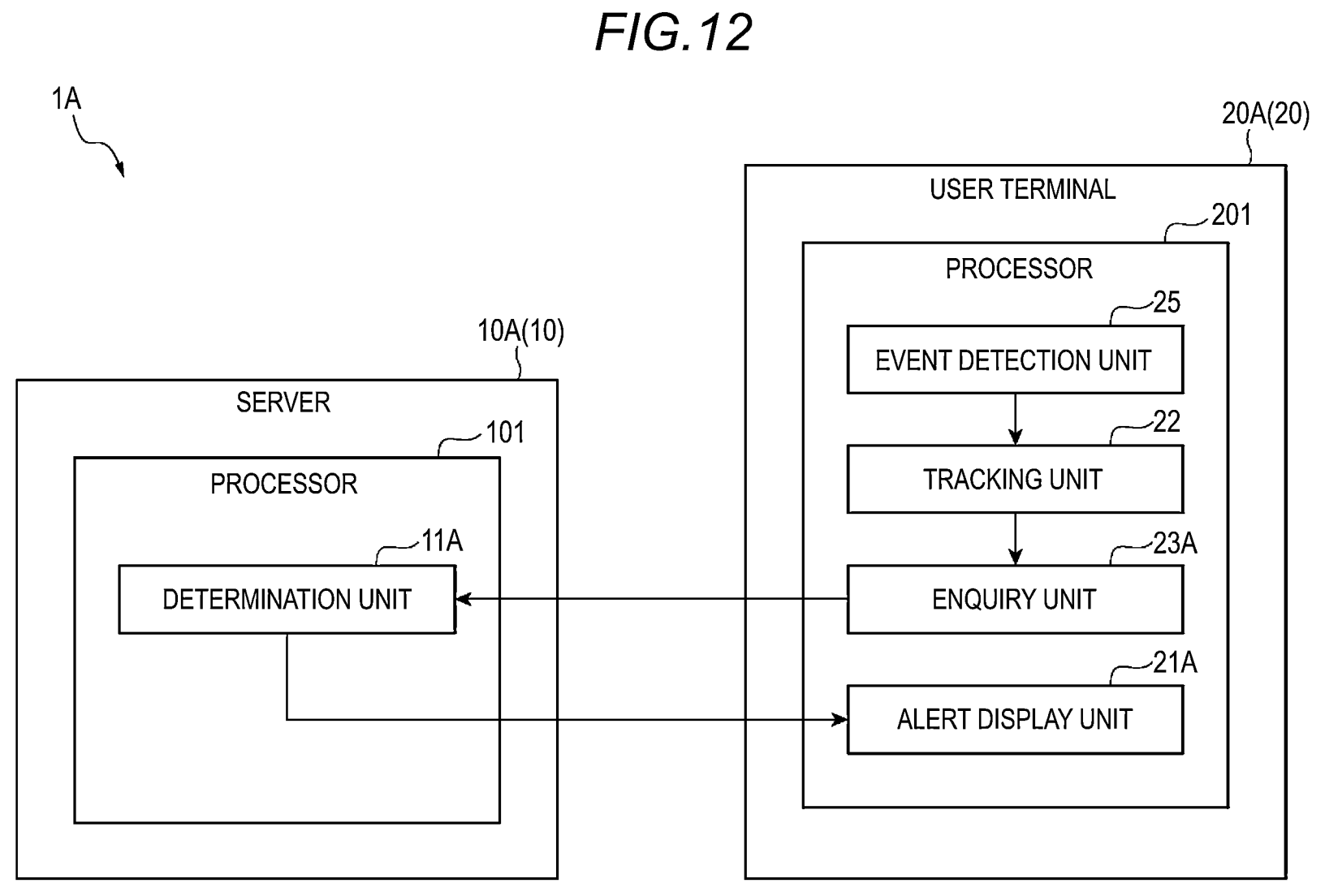

20A(20)
USER TERMINAL

201
PROCESSOR

25
EVENT DETECTION UNIT

22
TRACKING UNIT

23A
ENQUIRY UNIT

21A
ALERT DISPLAY UNIT

10A(10)
SERVER

101
PROCESSOR

11A
DETERMINATION UNIT

ALERT DISPLAY SYSTEM, ALERT DISPLAY METHOD, AND ALERT DISPLAY PROGRAM

FIELD

One aspect of the present disclosure relates to an alert display system, an alert display method, and an alert display program.

BACKGROUND

In PTL 1, an electronic device improving the perceptual state of a user regarding an alert is described. In such an electronic device, in a case where the user is not looking at the electronic device, priming queue (a sense of vision, a sense of touch, a voice, or the like) is output, and an alert is further output. In PTL 2 and PTL 3, a technology of detecting whether a user is looking at a screen on a device is described.

PATENT LITERATURE

PTL 1: JP2017-224313A
PTL 2: JP2020-502491A
PTL 3: JP2014-146871A

SUMMARY

It is desirable to provide an environment in which a user easily notices an alert.

An alert display system according to one aspect of the disclosure includes at least one processor. The at least one processor displays an alert on a display device of a user terminal, detects a line of sight of a user of the user terminal, acquires viewpoint coordinates of the user on the display device, and changes a display form of the alert on the basis of the viewpoint coordinates and area coordinates of the alert on the display device.

In such an aspect, the viewpoint coordinates of the user on the display device of the user terminal are acquired, and the display form of the alert is changed on the basis of the viewpoint coordinates and the area coordinates of the alert. That is, the display form of the alert is changed on the basis of where the user is looking on the display device, and where the alert is displayed on the display device. By the alert of which the display form is changed, it is possible to provide an environment in which the user easily notices the alert.

According to one aspect of the disclosure, it is possible to provide the environment in which the user easily notices the alert.

BRIEF DESCRIPTION OF DRAWINGS

FIG. 3 is a diagram illustrating an example of a functional configuration relevant to the alert display system according to the embodiment.

FIG. 4 is a diagram illustrating an example of initial display of an alert.

FIG. 12 is a diagram illustrating an example of a functional configuration relevant to an alert display system according to another embodiment.

DETAILED DESCRIPTION

Figure 1:
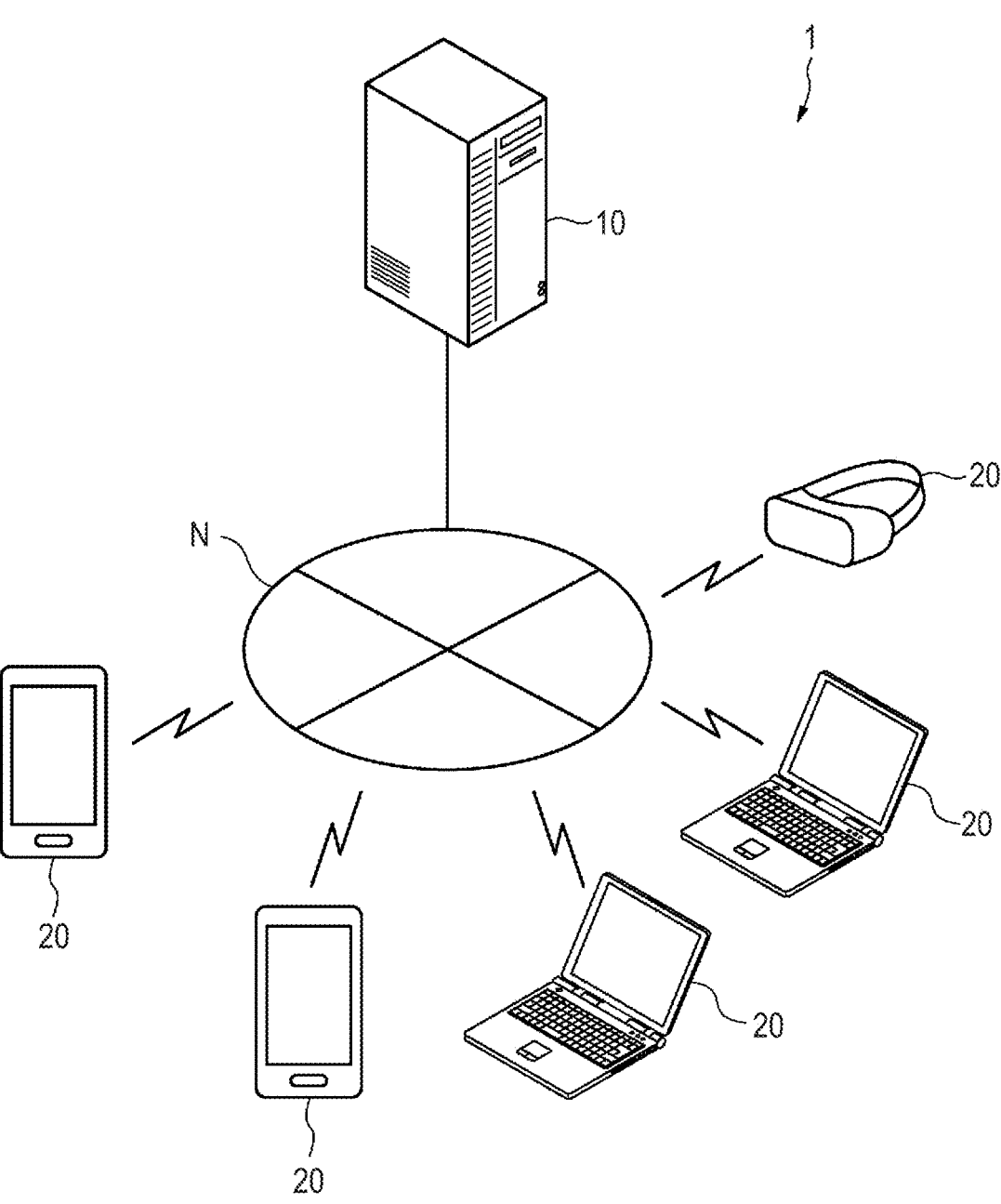
FIG. 1 is a diagram illustrating an example of application of an alert display system according to an embodiment.

Hereinafter, embodiments in the disclosure will be described in detail with reference to the attached drawings. In the description of the drawings, the same reference numerals will be applied to the same or equivalent constituents, and the repeated description will be omitted.
[Outline of System]

An alert display system according to an embodiment is a computer system supporting the notice of a user for an alert. The user is a person who uses the alert display system. The alert indicates information for attracting the attention of a person. The expression form of the alert is not limited, and for example, the alert may be expressed by a document, an image (for example, a picture, a video, and the like), or a combination thereof. "Supporting" is performed by changing the display form of the alert in order to facilitate the notice of the user for the alert. The display form of the alert indicates a state where a person is capable of recognizing the information of the alert through a sense of vision. "Changing the display form" indicates that some changes are added to the state of the alert, and for example, indicates that a visual effect is added to the alert.

The alert display system changes the display form of the alert on the basis of where the user is looking, and where the alert is displayed. For example, the alert display system detects the line of sight of the user, and acquires the viewpoint coordinates of the user. The viewpoint coordinates, for example, are coordinates indicating the position of the viewpoint of the user on a display device of a user terminal. The viewpoint coordinates, for example, can be expressed by using a two-dimensional or three-dimensional coordinate system. The viewpoint coordinates may be acquired by the user terminal, or may be acquired by another computer different from the user terminal. The user terminal may include one display device, or may include a plurality of display devices. The alert display system changes the display form of the alert on the basis of the viewpoint coordinates and the area coordinates of the alert. The area coordinates are coordinates indicating the area (the range) of the display position of the alert. The alert display system may be configured by using a server, or may be configured without using a server. In an example, the alert display system may include a server system having one or a plurality of servers. The alert display system may include a plurality of user terminals connected to the same server system, and display devices provided in each of the user terminals. In this case, either each of the user terminals or each of the display devices (hereinafter, referred to as a "device group") may acquire the viewpoint coordinates of the user, any of the device group may be a target for detecting the viewpoint coordinates of the user (a target that the user is looking at), or any of the device group may have a function of displaying an alert to the user. The alert display system may detect in advance and store the relative position and direction of the viewpoint coordinates in the device group. Hereinafter, the server and the server system will be collectively referred to as a "server".

[Configuration of System]

FIG. 1 is a diagram illustrating an example of the application of an alert display system 1. The alert display system 1 includes a server 10 and a user terminal 20. The server 10 is a computer determining a positional relationship between the viewpoint coordinates and the area coordinates of the alert, in response to the enquiry of at least one user terminal 20. The server 10 is connected to a plurality of user terminals 20 through a communication network N. The configuration of the communication network N is not limited. For example, the communication network N may be configured by including Internet, or may be configured by including Intranet.

The user terminal 20 is a computer that is used by the user. In FIG. 1, five user terminals 20 are illustrated, but the number of user terminals 20 is not limited. As illustrated in FIG. 1, the type of user terminal 20 is not limited. For example, the user terminal 20 may be a mobile terminal such as an advanced mobile phone (a smart phone), a tablet terminal, a wearable terminal (for example, a head-mounted display (HMD), smart glass, and the like), a laptop personal computer, and a mobile phone. Alternatively, the user terminal 20 is a floor-standing type terminal such as a desktop personal computer.

Figure 2:
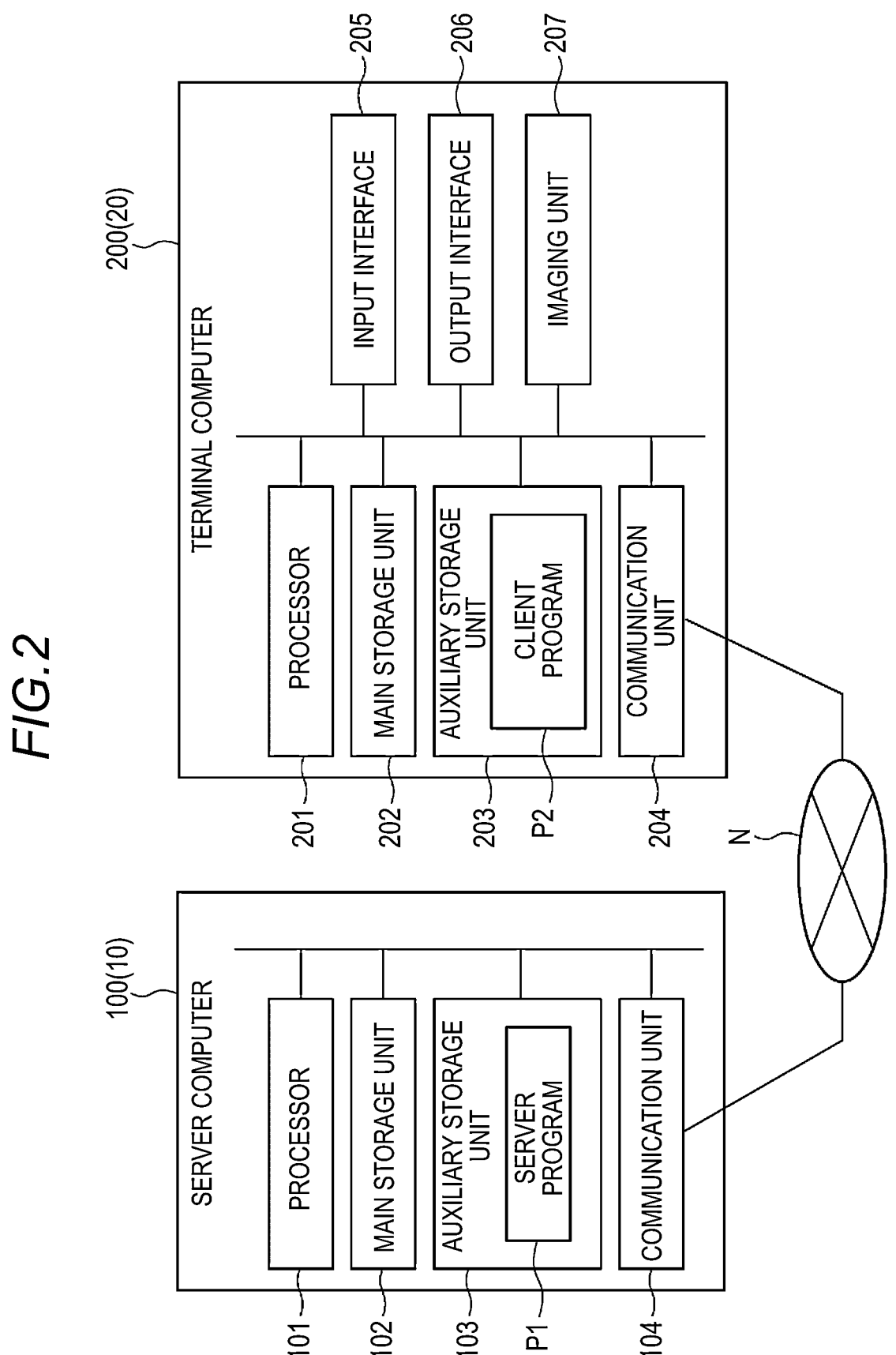
FIG. 2 is a diagram illustrating an example of a hardware configuration relevant to the alert display system according to the embodiment.

FIG. 2 is a diagram illustrating an example of a hardware configuration relevant to the alert display system 1. FIG. 2 illustrates a server computer 100 that functions as the server 10, and a terminal computer 200 that functions as the user terminal 20.

As an example, the server computer 100 includes a processor 101, a main storage unit 102, an auxiliary storage unit 103, and a communication unit 104, as a hardware constituent. The processor 101 is an arithmetic device executing an operating system and an application program. Examples of the processor include a central processing unit (CPU) and a graphics processing unit (GPU). The main storage unit 102 is a device storing a program, an arithmetic result, and the like, and for example, includes a read only memory (ROM) or a random access memory (RAM). The auxiliary storage unit 103 is a device that is capable of generally storing a larger amount of data than the main storage unit 102, and includes a non-volatile storage medium such as a hard disk and a flash memory. The auxiliary storage unit 103 stores a server program P1 for allowing the server computer 100 to function as the server 10 and various data pieces. In this embodiment, an alert display program is implemented as the server program P1. The communication unit 104 is a device executing data communication with another computer through the communication network N, and for example, includes a network card or a wireless communication module.

Each functional element of the server 10 is attained by reading the server program P1 on the processor 101 or the main storage unit 102, and allowing the processor 101 to execute the program. The server program P1 includes a code for attaining each of the functional elements of the server 10. The processor 101 operates the communication unit 104 in accordance with the server program P1, and executes the reading and the writing of the data on the main storage unit 102 or the auxiliary storage unit 103.

The server 10 may include one or a plurality of computers. In a case where the plurality of computers are used, such computers are connected to each other through the communication network N to logically configure one server 10.

As an example, the terminal computer 200 includes a processor 201, a main storage unit 202, an auxiliary storage unit 203, a communication unit 204, an input interface 205, an output interface 206, and an imaging unit 207, as a hardware constituent. The processor 201 is an arithmetic device executing an operating system and an application program, and for example, can be a CPU or a GPU. The main storage unit 202 is a device storing a program, an arithmetic result, and the like, and for example, includes a ROM or a RAM. The auxiliary storage unit 203 is a device that is capable of generally storing a larger amount of data than the main storage unit 202, and for example, includes a non-volatile storage medium such as a hard disk and a flash memory. The auxiliary storage unit 203 stores a client program P2 for allowing the terminal computer 200 to function as the user terminal 20 and various data pieces. The communication unit 204 is a device executing data communication with another computer through the communication network N, and for example, includes a network card or a wireless communication module. The input interface 205 is a device receiving the data on the basis of the manipulation or the operation of the user, and for example, includes at least one of a keyboard, a manipulation button, a pointing device, a touch panel, a microphone, a sensor, and a camera. The output interface 206 is a device outputting the data processed by the terminal computer 200, and for example, includes at least one of a monitor, a touch panel, an HMD, and a speaker. The imaging unit 207 is a device capturing the image of the actual world, and for example, is a camera capturing a video or a picture. The imaging unit 207 may also function as the input interface 205.

Each of the functional elements of the user terminal 20 is attained by reading the corresponding client program P2 in the processor 201 or the main storage unit 202 and allowing the processor 201 to execute the program. The client program P2 includes a code for attaining each of the functional elements of the user terminal 20. The processor 201 operates the communication unit 204, the input interface 205, the output interface 206, or the imaging unit 207 in accordance with the client program P2, and performs the reading and the writing of the data on the main storage unit 202 or the auxiliary storage unit 203.

At least one of the server program P1 and the client program P2 may be provided after being non-transitorily recorded in a physical recording medium such as a CD-ROM, a DVD-ROM, and a semiconductor memory. Alternatively, at least one of such programs may be provided as a data signal superimposed on a carrier wave through the communication network N. Such programs may be separately provided, or may be provided together.

Figure 3:
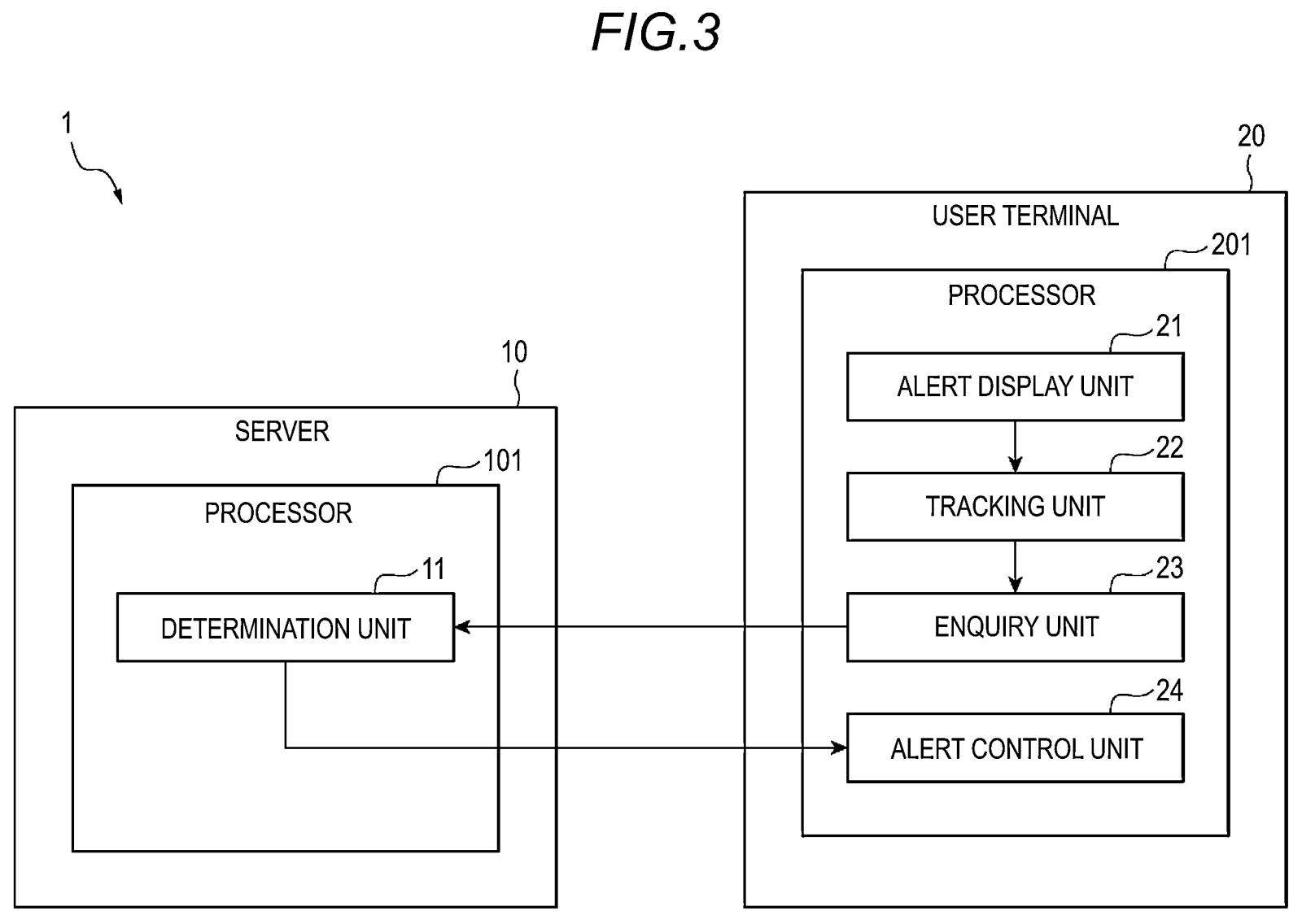

FIG. 3 is a diagram illustrating an example of a functional configuration relevant to the alert display system 1. The server 10 includes a determination unit 11 as a functional element. The determination unit 11 is a functional element determining a positional relationship between the viewpoint coordinates and the area coordinates of the alert, in response to the enquiry from the user terminal 20.

The user terminal 20 includes an alert display unit 21, a tracking unit 22, an enquiry unit 23, and an alert control unit 24, as a functional element. The alert display unit 21 is a functional element displaying an alert relevant to a detected event on the display device of the user terminal 20. The tracking unit 22 is a functional element that detects the line of sight of the user of the user terminal 20, and acquires the viewpoint coordinates on the display device. The enquiry unit 23 is a functional element transmitting a determination request based on the viewpoint coordinates and the area coordinates of the alert to the server 10. The determination request is a request to enquire about the positional relationship between the viewpoint coordinates and the area coordinates of the alert. The alert control unit 24 is a functional element changing the display form of the alert.

Figure 4:
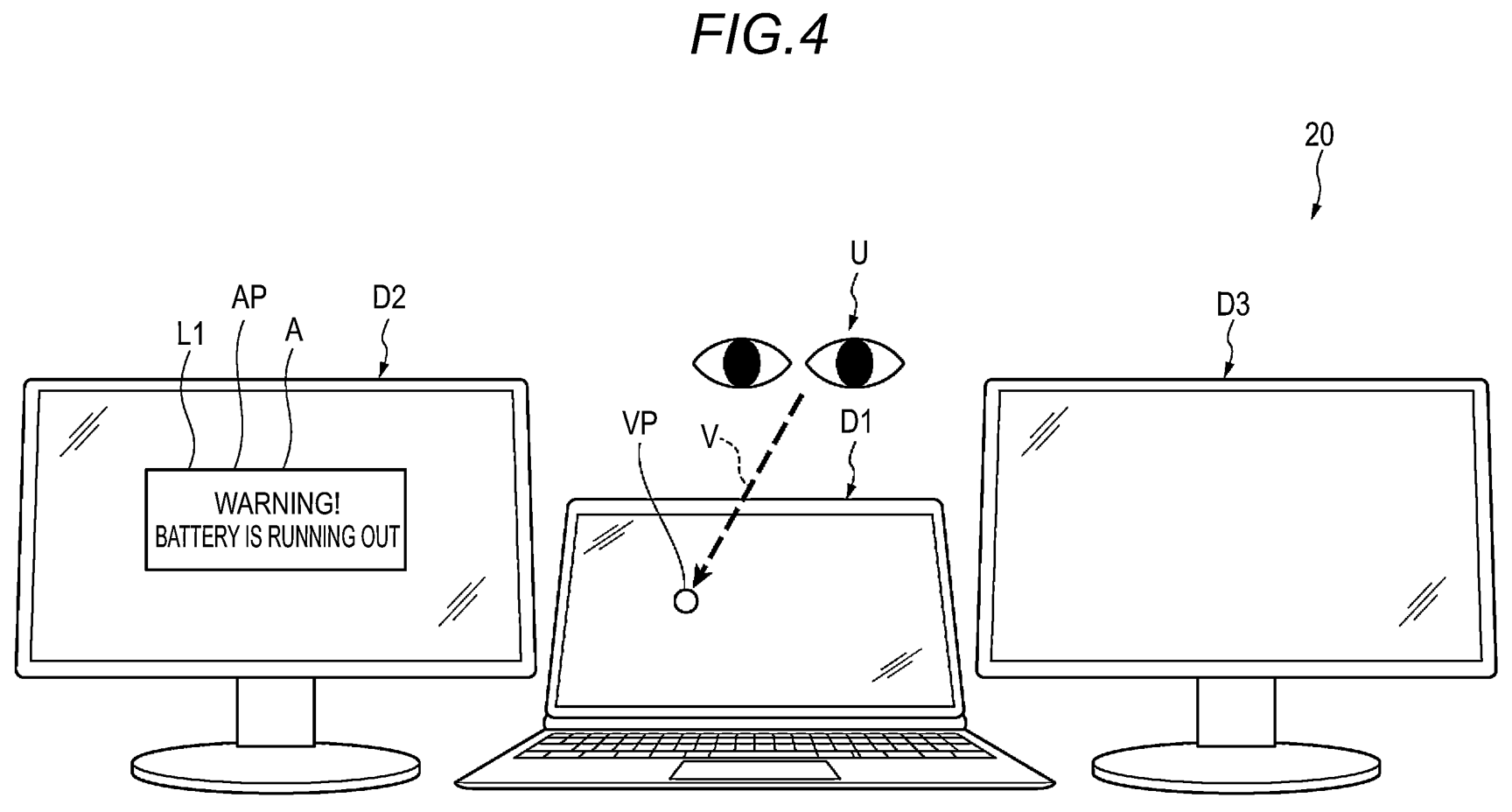

FIG. 4 is a diagram illustrating an example of the initial display of the alert. The user terminal 20 includes a plurality of display devices D1, D2, and D3. For example, the plurality of display devices D1, D2, and D3 are configured as so-called multi-display. In an example, the plurality of display devices D1, D2, and D3 display a screen or the like relevant to the operating system and the application program of the user terminal 20 in cooperation. Coordinates on the plurality of display devices D1, D2, and D3, for example, can be expressed by a two-dimensional or three-dimensional coordinate system.

The user terminal 20 may include a plurality of computers having operating systems different from each other. For example, the user terminal 20 may include a first user terminal, and a second user terminal having an operating system different from an operating system of the first user terminal. In an example, the first user terminal may include the display devices D1 and D2, and the second user terminal may include the display device D3. In this case, the coordinates on the plurality of display devices D1 and D2 and the coordinates on the display device D3 may be expressed by different coordinate systems, or may be expressed by virtually the same coordinate system.

The alert display unit 21 displays the alert at the initial position on the display device. The initial position is a predetermined display position at which the alert is initially displayed. The initial position can be different for each alert. For example, the alert display unit 21 displays an alert A at an initial position L1 on the display device D2. Area coordinates AP of the alert A are at the initial position L1 on the display device D2.

Subsequently, the tracking unit 22 detects a line V of sight of a user U, and acquires viewpoint coordinates VP of the user U. In an example, the viewpoint coordinates VP of the user U are on the display device D1. The enquiry unit 23 transmits a determination request based on the viewpoint coordinates VP of the user U and the area coordinates AP of the alert A to the server 10. The determination unit 11 of the server 10, for example, determines whether the viewpoint coordinates VP of the user U are within a predetermined range from the area coordinates AP of the alert A. In an example, the determination unit 11 determines whether the viewpoint coordinates VP are on the area coordinates AP. The determination unit 11 may generate a determination result indicating that it is necessary or not necessary to change the display form of the alert. Then, the determination unit 11 transmits the determination result to the user terminal 20.

Subsequently, the alert control unit 24 changes the display form of the alert on the basis of the determination result. With reference to FIG. 5 to FIG. 8, a change example of the display form of the alert will be described. In FIG. 5 to FIG. 8, the user U is directing the line V of sight toward the display device D1. That is, the viewpoint coordinates VP of the user U are on the display device D1.

Figure 5:
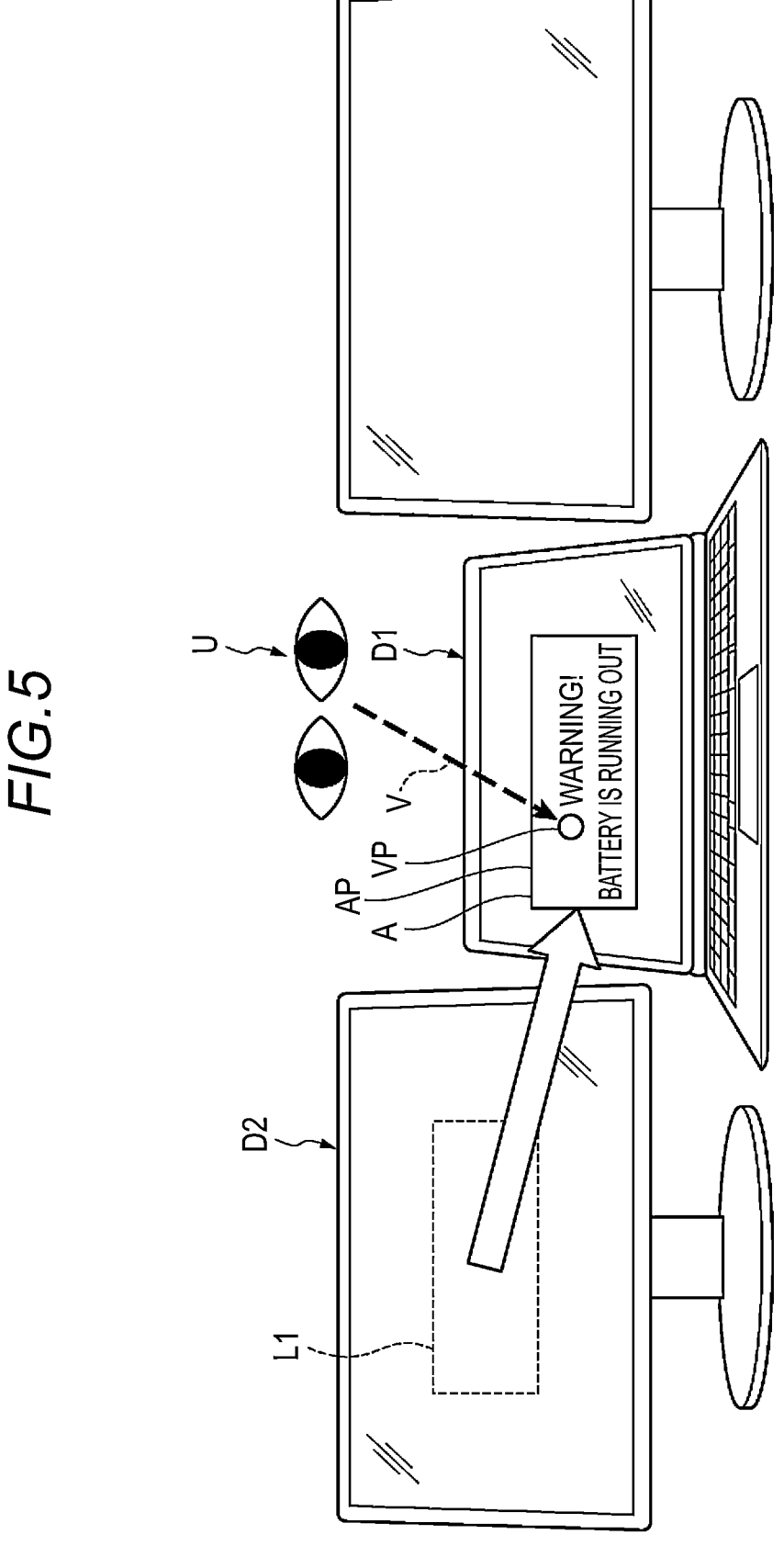
FIG. 5 is a diagram illustrating a first change example of a display form of the alert.

FIG. 5 is a diagram illustrating a first change example of the display form of the alert. In the first change example, the alert control unit 24 moves the alert toward the viewpoint coordinates from a display position at which the alert is displayed. For example, the alert control unit 24 moves the alert A toward the viewpoint coordinates VP on the display device D1 from the initial position L1 on the display device D2 at which the alert A is displayed. The alert control unit 24 may move the alert A such that the area coordinates AP of the alert A and the viewpoint coordinates VP overlap with each other, or may move the alert A such that the area coordinates AP of the alert A and the viewpoint coordinates VP do not overlap with each other. In addition, the alert control unit 24 may gradually move the alert A toward the viewpoint coordinates VP, or may move the alert A such that the alert A disappears from the display position at which the alert is displayed and is displayed on the viewpoint coordinates VP without being displayed in the middle. In an example, the alert control unit 24 gradually moves the alert A such that the area coordinates AP of the alert A and the viewpoint coordinates VP overlap with each other.

Figure 6:
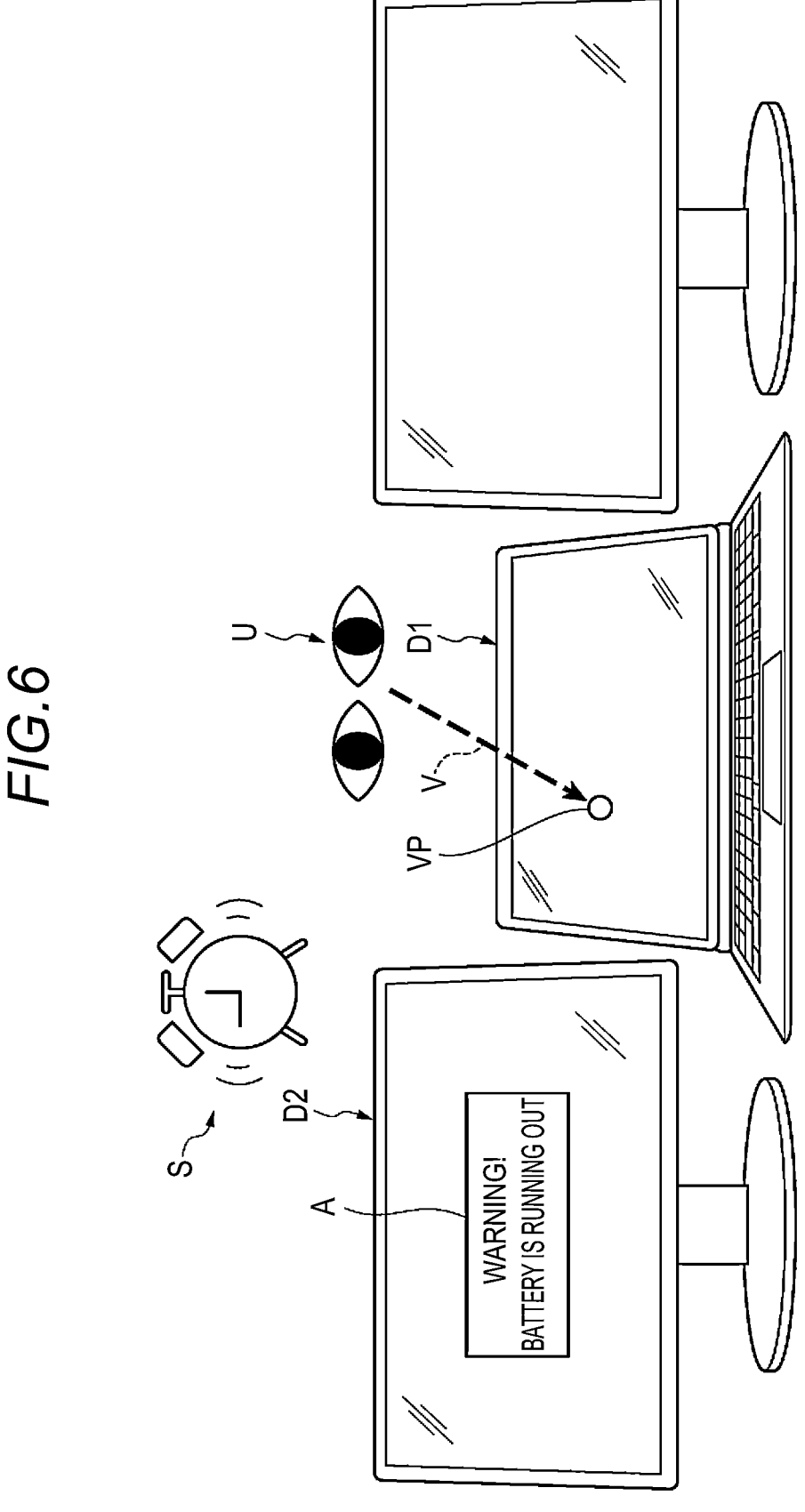
FIG. 6 is a diagram illustrating a second change example of the display form of the alert.

FIG. 6 is a diagram illustrating a second change example of the display form of the alert. In the second change example, the alert control unit 24 continuously outputs a voice associated with the alert while changing the display form of the alert. "While changing the display form" is a part of or the entire time zone while the display form of the alert is changed. The voice may be a predetermined voice (hereinafter, referred to as a "predetermined sound") output together with the display of the alert, or may be a voice different from the predetermined sound. The alert control unit 24 may output the voice at a predetermined time interval. The alert control unit 24 may change a sound volume in accordance with the elapsed time. In an example, the alert control unit 24 continuously outputs a voice S such that the voice S associated with the alert A continuously produced while changing the display form of the alert A.

Figure 7:
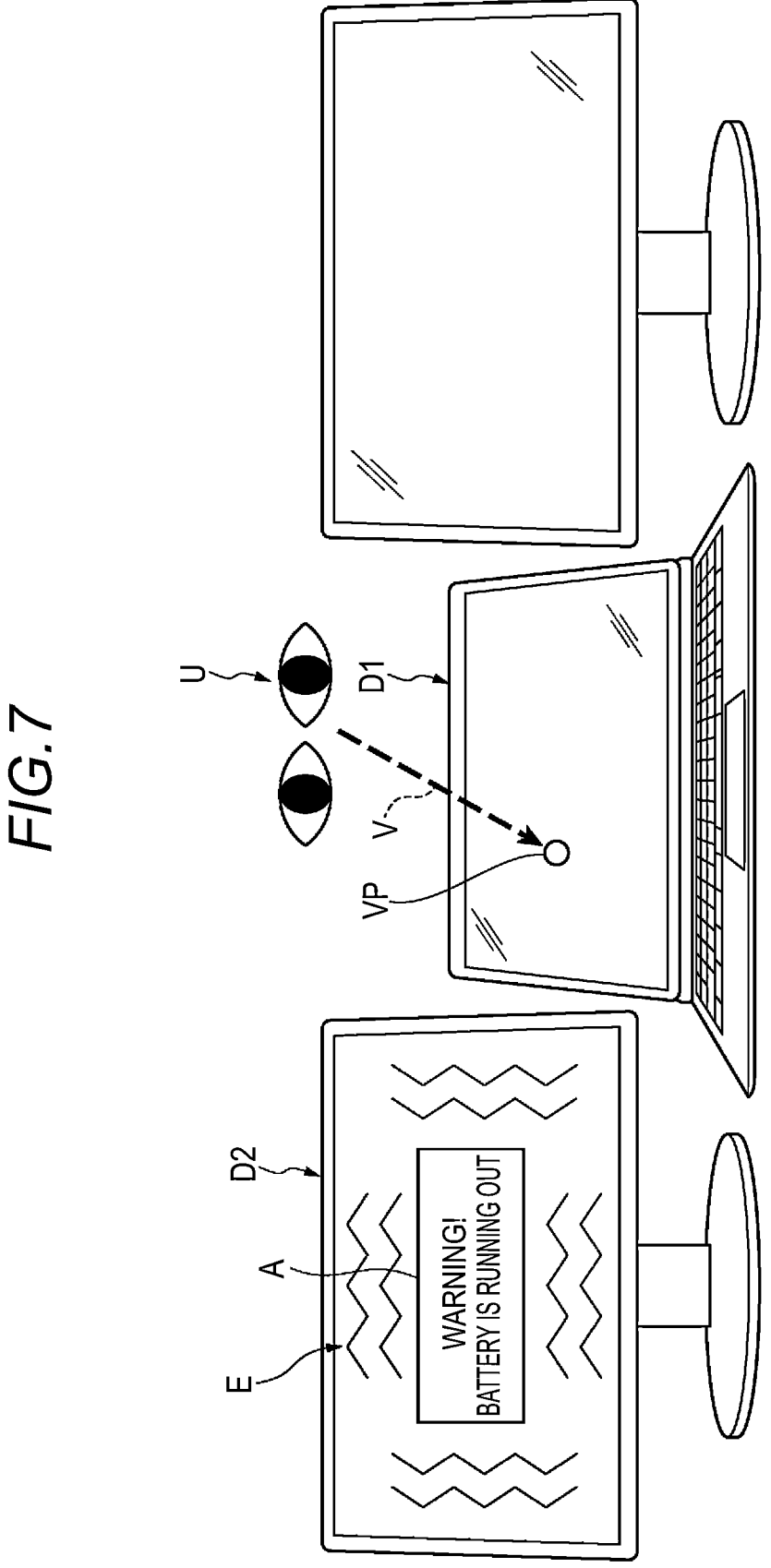
FIG. 7 is a diagram illustrating a third change example of the display form of the alert.

FIG. 7 is a diagram illustrating a third change example of the display form of the alert. In the third change example, the alert control unit 24 adds an effect different from the movement of the display position to the alert. For example, the alert control unit 24 adds a vibrating effect E to the alert A. The alert control unit 24 may add an effect of changing a shape to the alert A. Examples of the effect of changing the shape include an effect of gradually expanding to a predetermined size, an effect of repeating expansion and contraction, and the like. The alert control unit 24 may add an effect of blinking by switching the display and non-display of the alert A to the alert A. The alert control unit 24 may control the alert A such that the effect added to the alert A is expressed at a predetermined time interval.

Figure 8:
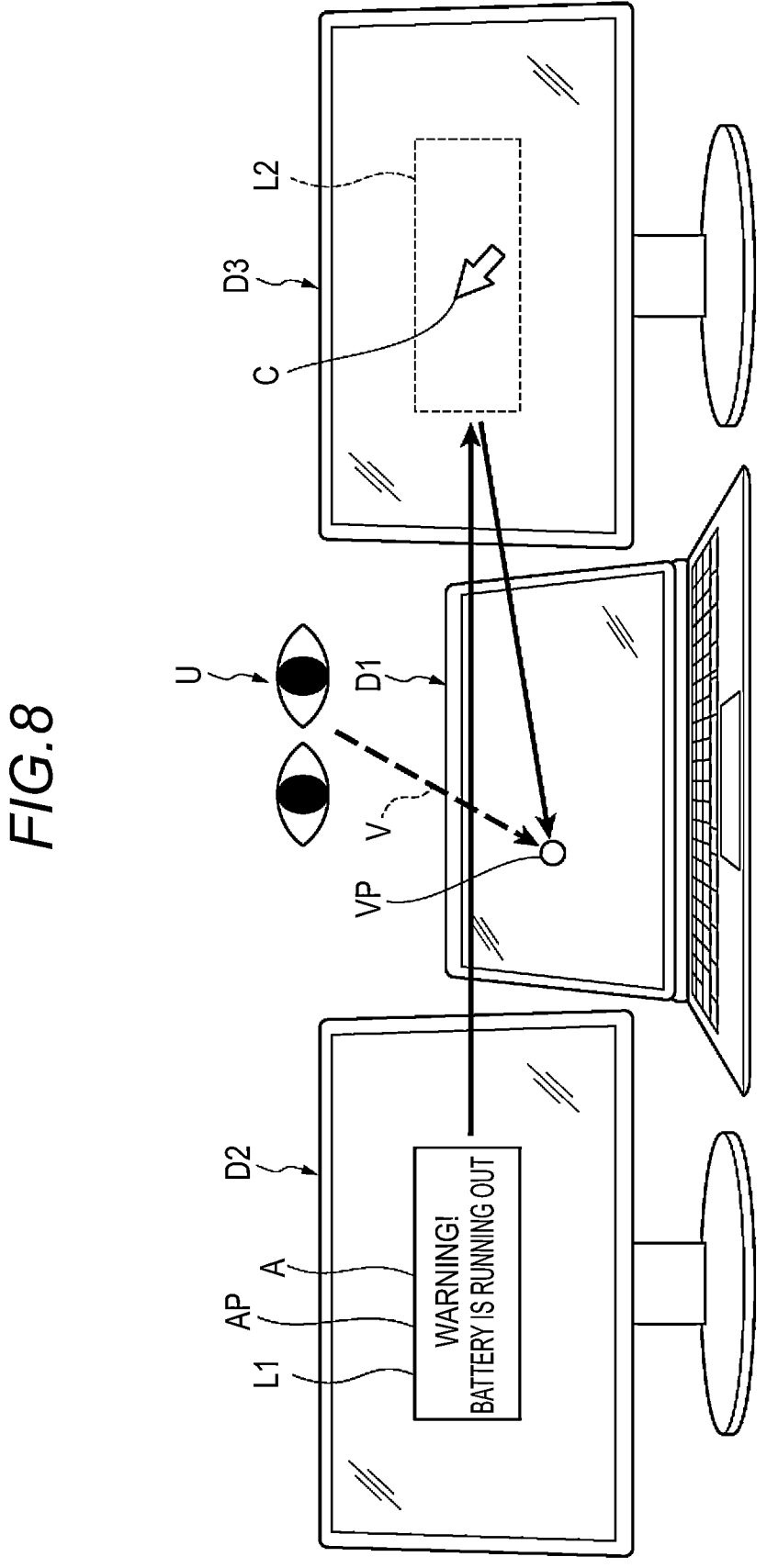
FIG. 8 is a diagram illustrating a fourth change example of the display form of the alert.

FIG. 8 is a diagram illustrating a fourth change example of the display form of the alert. A cursor C, which is an interface indicating a manipulation target, is displayed on the display device D3. The interface indicating the manipulation target is not limited to the cursor C (a mouse pointer), and for example, may be a cursor, an active window, or the like, which is used for character input.

In the fourth change example, the alert control unit 24 moves the alert toward a display position set on the basis of the display position of the interface indicating the manipulation target on the display device from the initial position that is the display position at which the alert is initially displayed. For example, the alert control unit 24 may move the alert A toward a display position L2 set on the basis of the display position of the cursor C on the display device D3 from the initial position L1 that is the display position at which the alert A is initially displayed. The display position L2 may be a given range centered on the cursor C, and for example, may be a rectangular range centered on the cursor C, but is not limited thereto. The alert control unit 24 may move the alert A such that the area coordinates AP of the alert A and the cursor C overlap with each other, or may move the alert A such that the area coordinates AP of the alert A and the cursor C do not overlap with each other. In addition, the alert control unit 24 may gradually move the alert A toward the display position L2, or may move the alert A such that the alert A is abruptly displayed at the display position L2. In an example, the alert control unit 24 gradually moves the alert A such that the area coordinates AP of the alert A and the cursor C overlap with each other. Accordingly, the area coordinates AP of the alert A are moved to the display position L2 on the display device D3.

Subsequently, the tracking unit 22 detects the line V of sight of the user U, and acquires the viewpoint coordinates VP of the user U. In an example, the viewpoint coordinates VP of the user U are on the display device D1. The enquiry unit 23 transmits the determination request based on the viewpoint coordinates VP of the user U and the area coordinates AP of the alert A to the server 10. The determination unit 11 of the server 10, for example, determines whether the viewpoint coordinates VP of the user U are within the predetermined range from the area coordinates AP of the alert A. In an example, the determination unit 11 determines whether the viewpoint coordinates VP are on the area coordinates AP. Then, the determination unit 11 transmits the determination result to the user terminal 20.

Subsequently, the alert control unit 24 changes the display form of the alert on the basis of the determination result. For example, the alert control unit 24 moves the alert toward the viewpoint coordinates from the display position at which the alert is displayed. In an example, the alert control unit 24 moves the alert A toward the viewpoint coordinates VP on the display device D1 from the display position L2 on the display device D3 at which the alert A is displayed. As described above, in the fourth change example illustrated in FIG. 8, the alert control unit 24 moves the alert toward the display position set on the basis of the display position of the interface indicating the manipulation target on the display device from the initial position that is the display position at which the alert is initially displayed. Further, the alert control unit 24 moves the alert toward the viewpoint coordinates from the display position at which the alert is displayed on the basis of the viewpoint coordinates, and the area coordinates of the alert on the display device. That is, the alert control unit 24 moves the alert in two steps.

[Operation of System]

Figure 9:
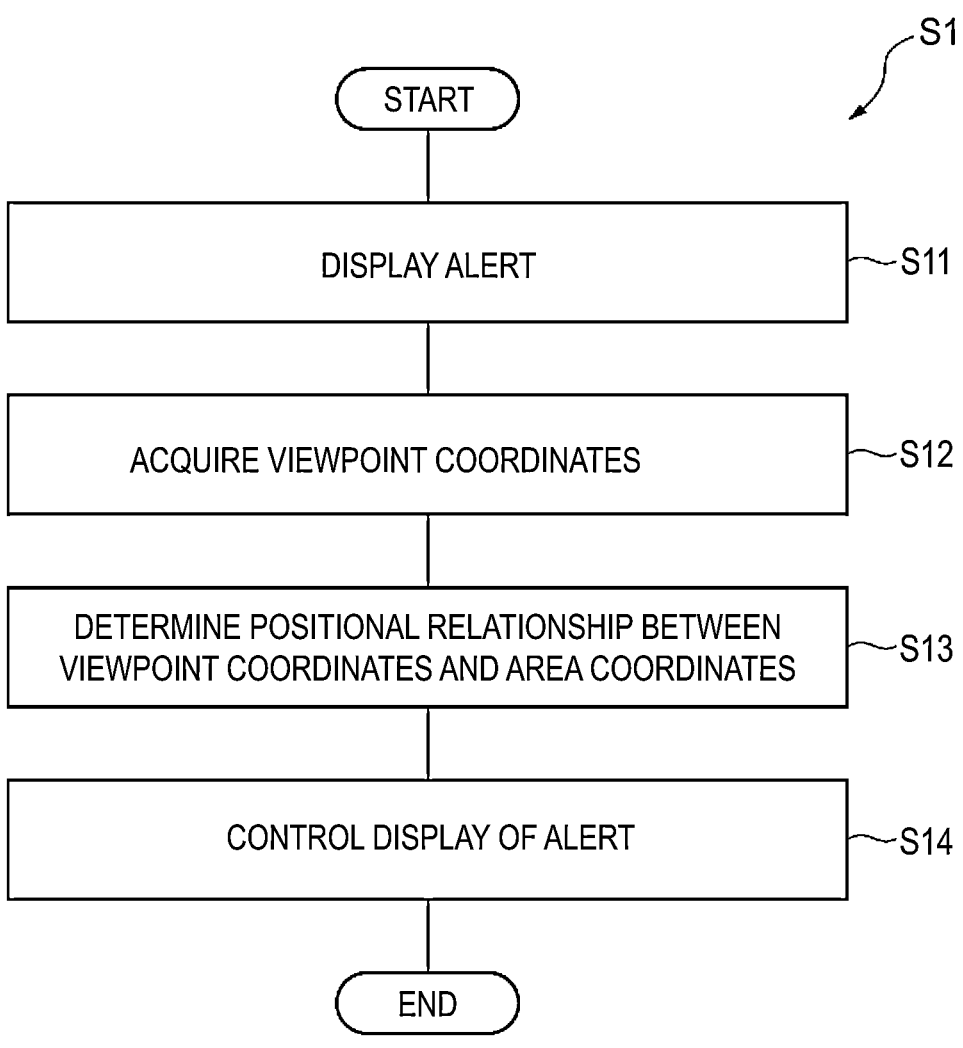
FIG. 9 is a flowchart illustrating a first operation example of the alert display system according to the embodiment.

The operation of the alert display system 1 will be described, and an alert display method according to this embodiment will be described. FIG. 9 is a flowchart illustrating a first operation example of the alert display system 1 as a processing flow S1.

In step S11, the alert display unit 21 of the user terminal 20 displays the alert. For example, the alert display unit 21 displays an alert relevant to an event that occurs on the operating system or the application system of the user terminal 20 on the display device of the user terminal 20. The alert display unit 21, for example, may display an alert relevant to an event that occurs on a Web application on the display device of the user terminal 20. For example, the alert display unit 21 displays the alert at the initial position for each alert.

In step S12, the tracking unit 22 of the user terminal 20 acquires the viewpoint coordinates of the user. For example, the tracking unit 22 specifies the viewpoint coordinates on the basis of the eye movement of the user. A method for specifying the viewpoint coordinates is not limited. As an example, the tracking unit 22 may capture the peripheral image of the eye of the user with the imaging unit 207 of the user terminal 20, and may specify the viewpoint coordinates on the basis of the position of the iris with the inner corner of the eye of the user as a reference point. As another example, the tracking unit 22 may specify the viewpoint coordinates of the user by using a corneal reflection method (PCCR). In the case of using the corneal reflection method, the user terminal 20 may include an infrared emitter and an infrared camera, as a hardware configuration.

In step S13, the enquiry unit 23 of the user terminal 20 transmits the determination request based on the viewpoint coordinates and the area coordinates of the alert to the server 10. Then, the determination unit 11 of the server 10 determines whether the viewpoint coordinates of the user are within the predetermined range from the area coordinates of the alert. The determination unit 11 may determine whether the viewpoint coordinates are on the area coordinates. Here, the determination unit 11 determines that the viewpoint coordinates are outside the predetermined range from the area coordinates. The determination unit 11 transmits the determination result to the user terminal 20.

In step S14, the alert control unit 24 of the user terminal 20 changes the display form of the alert on the basis of the determination result. For example, in a case where the viewpoint coordinates are outside the predetermined range from the area coordinates, the alert control unit 24 changes the display form of the alert. That is, the alert control unit 24 changes the display form of the alert on the basis of the viewpoint coordinates and the area coordinates of the alert on the display device. In a case where the viewpoint coordinates do not overlap with the area coordinates, the alert control unit 24 may change the display form of the alert.

The processing of steps S12 to S14 may be repeatedly executed. For example, the tracking unit 22 acquires the viewpoint coordinates of the user at a predetermined time interval. The enquiry unit 23 transmits the determination request to the server 10 at a predetermined time interval. The determination unit 11 transmits the determination result to the user terminal 20 for each determination request. For example, the alert control unit 24 changes the display form of the alert until the viewpoint coordinates overlap with the area coordinates of the alert.

In relation to steps S12 to S14, the alert control unit 24 may control whether to change the display form of the alert on the basis of the viewpoint coordinates and the area coordinates until a time set in advance elapses after the alert is initially displayed. For example, the tracking unit 22 acquires the trajectory of the viewpoint indicating how the viewpoint of the user is moved on the display device of the user terminal 20 within the time set in advance after the alert is initially displayed. In an example, the tracking unit 22 specifies the viewpoint coordinates of the user at each predetermined time interval, and acquires a plurality of viewpoint coordinates arranged in chronological order as the trajectory of the viewpoint. The enquiry unit 23 transmits the determination request based on the trajectory of the viewpoint and the area coordinates of the alert to the server 10. The determination unit 11 determines whether the trajectory of the viewpoint is within the predetermined range from the area coordinates of the alert, and transmits the determination result to the user terminal 20. For example, the determination unit 11 determines whether there are one or a plurality of viewpoint coordinates overlapping with the area coordinates of the alert among the trajectory of the viewpoint. As another example, the determination unit 11 determines whether the trajectory of the viewpoint at a predetermined time overlaps with the area coordinates of the alert. The alert control unit 24 controls whether to change the display form of the alert on the basis of the determination result. In an example, in a case where it is determined that there are one or a plurality of viewpoint coordinates overlapping with the area coordinates of the alert, the alert control unit 24 does not change the display form of the alert. In a case where it is determined that there are not one or a plurality of viewpoint coordinates overlapping with the area coordinates of the alert, the alert control unit 24 changes the display form of the alert.

In relation to steps S12 to S14, the alert control unit 24 may control whether to change the display form of the alert on the basis of the fact that the viewpoint coordinates are moved toward the area coordinates. For example, the tracking unit 22 acquires the trajectory of the viewpoint of the user at a predetermined time interval. The enquiry unit 23 transmits the determination request based on the trajectory of the viewpoint and the area coordinates of the alert to the server 10. The determination unit 11 determines whether the trajectory of the viewpoint approaches the area coordinates of the alert, and transmits the determination result to the user terminal 20. For example, determination unit 11 determines whether the trajectory of the viewpoint is moved a predetermined distance in a direction toward the area coordinates of the alert. As another example, the determination unit 11 determines whether the trajectory of the viewpoint is moved a distance within a predetermined range based on the area coordinates of the alert from outside the predetermined range.

In relation to step S11, the display device may include a first display device and a second display device. For example, the first display device may be the display device D2. The second display device may be the display devices D1 and D3. The alert display unit 21 may display the alert on the first display device (for example, the display device D2). For example, the alert display unit 21 may display the alert only on the first display device. In other words, the alert display unit 21 may display the alert A on the first display device without displaying the alert A on the second display device (for example, the display devices D1 and D3). In relation to step S14, in a case where the viewpoint coordinates are on the second display device, the alert control unit 24 may change the display form of the alert. In addition, in another example, in a case where the viewpoint coordinates are on the first display device but not within the predetermined range from the area coordinates of the alert, the alert control unit 24 may change the display form of the alert.

Figure 10:
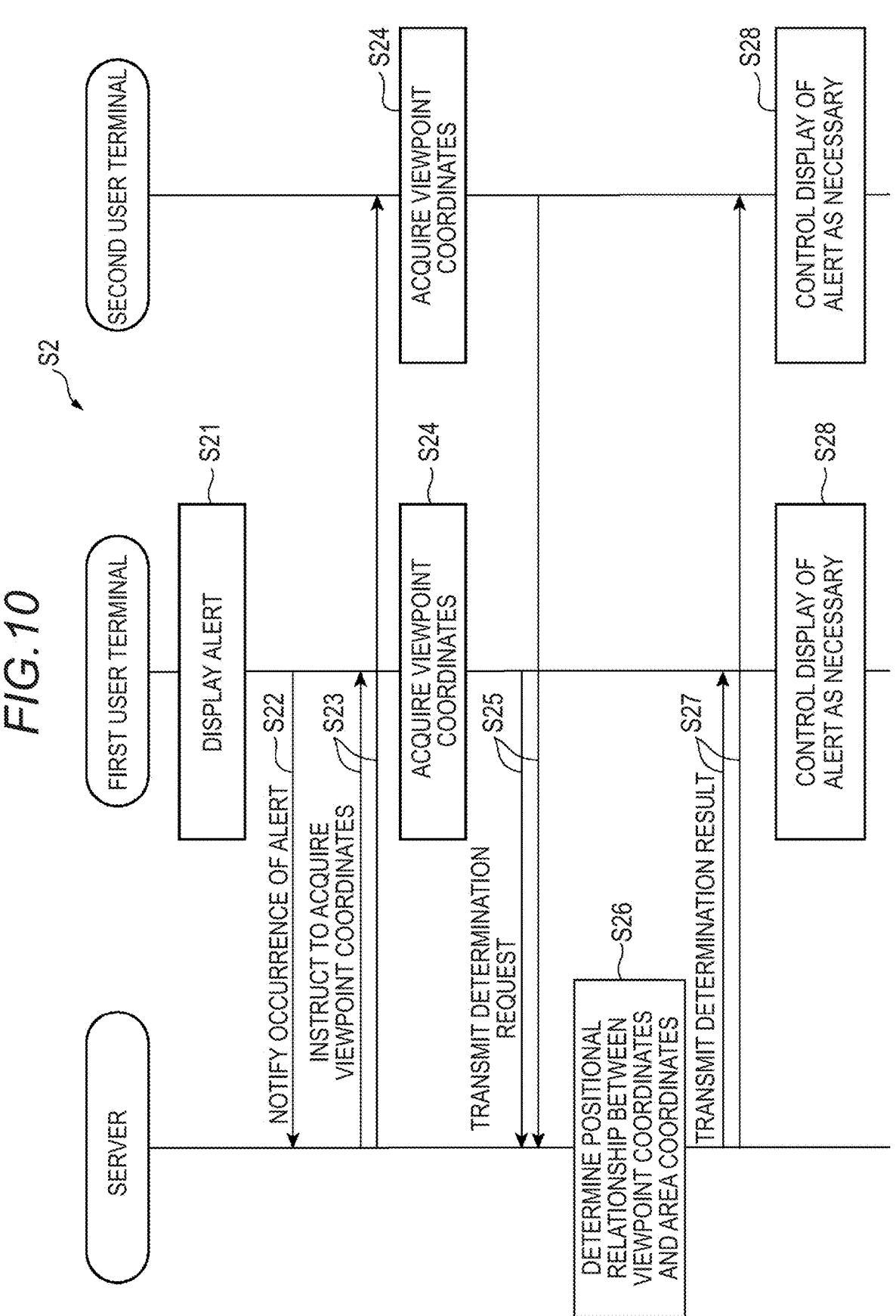
FIG. 10 is a sequence diagram illustrating a second operation example of the alert display system according to the embodiment.

FIG. 10 is a sequence diagram illustrating a second operation example of the alert display system 1 as a processing flow S2. The processing flow S2 is an example of the operation of the alert display system 1 in a case where the user terminal 20 includes the first user terminal and the second user terminal.

In step S21, the alert display unit 21 of the first user terminal displays the alert. For example, the alert display unit 21 of the first user terminal displays the alert relevant to the event that occurs on the operating system or the application system of the first user terminal on the display device of the first user terminal. The alert display unit 21 of the first user terminal, for example, may display the alert relevant to the event that occurs on the Web application on the display device of the first user terminal.

In step S22, the first user terminal transmits a notification of the occurrence of the alert on the first user terminal to the server 10. The first user terminal may transmit a notification including the area coordinates of the alert to the server 10. The server 10 receives the notification of the occurrence of the alert from the first user terminal.

In step S23, the server 10 transmits an instruction to acquire the viewpoint coordinates to the first user terminal and the second user terminal. Each of the first user terminal and the second user terminal receives the instruction to acquire the viewpoint coordinates from the server 10.

In step S24, each of the tracking unit 22 of the first user terminal and the tracking unit 22 of the second user terminal acquires the viewpoint coordinates of the user. Here, it is described that the user is directing the line of sight toward the display device of the second user terminal. That is, the viewpoint coordinates of the user are not on the display device of the first user terminal but on the display device of the second user terminal.

In step S25, the enquiry unit 23 of the first user terminal and the enquiry unit 23 of the second user terminal transmit the determination request based on the viewpoint coordinates and the area coordinates of the alert to the server 10. The first user terminal may transmit the determination request including the area coordinates of the alert on the first user terminal to the server 10. The server 10 receives the determination request from the first user terminal and the second user terminal.

In step S26, the determination unit 11 of the server 10 determines the positional relationship between the viewpoint coordinates and the area coordinates of the alert. Here, the determination unit 11 determines that the viewpoint coordinates on the display device of the second user terminal are outside the predetermined range from the area coordinates of the alert on the display device of the first user terminal.

In step S27, the determination unit 11 transmits the determination result to the first user terminal and the second user terminal. The determination result to be transmitted to the first user terminal may be different from the determination result to be transmitted to the second user terminal. For example, the determination unit 11 may transmit the determination result indicating that it is necessary to change the display form of the alert to the first user terminal, and may transmit the determination result indicating that it is not necessary to change the display form of the alert to the second user terminal. Each of the first user terminal and the second user terminal receives the determination result from the server 10.

In step S28, each of the alert control unit 24 of the first user terminal and the alert control unit 24 of the second user terminal changes the display form of the alert, as necessary. For example, in a case where the viewpoint coordinates are outside the predetermined range from the area coordinates, the alert control unit 24 of the first user terminal changes the display form of the alert. The alert control unit 24 of the second user terminal does not perform the processing.

The alert display system 1 may be configured without using the server 10. In this case, the functional element of the server 10 may be implemented in the user terminal 20. Alternatively, the functional element of the server 10 may be implemented in any of the plurality of user terminals 20. In relation to this, the alert display program may be attained as the client program P2.

Figure 11:
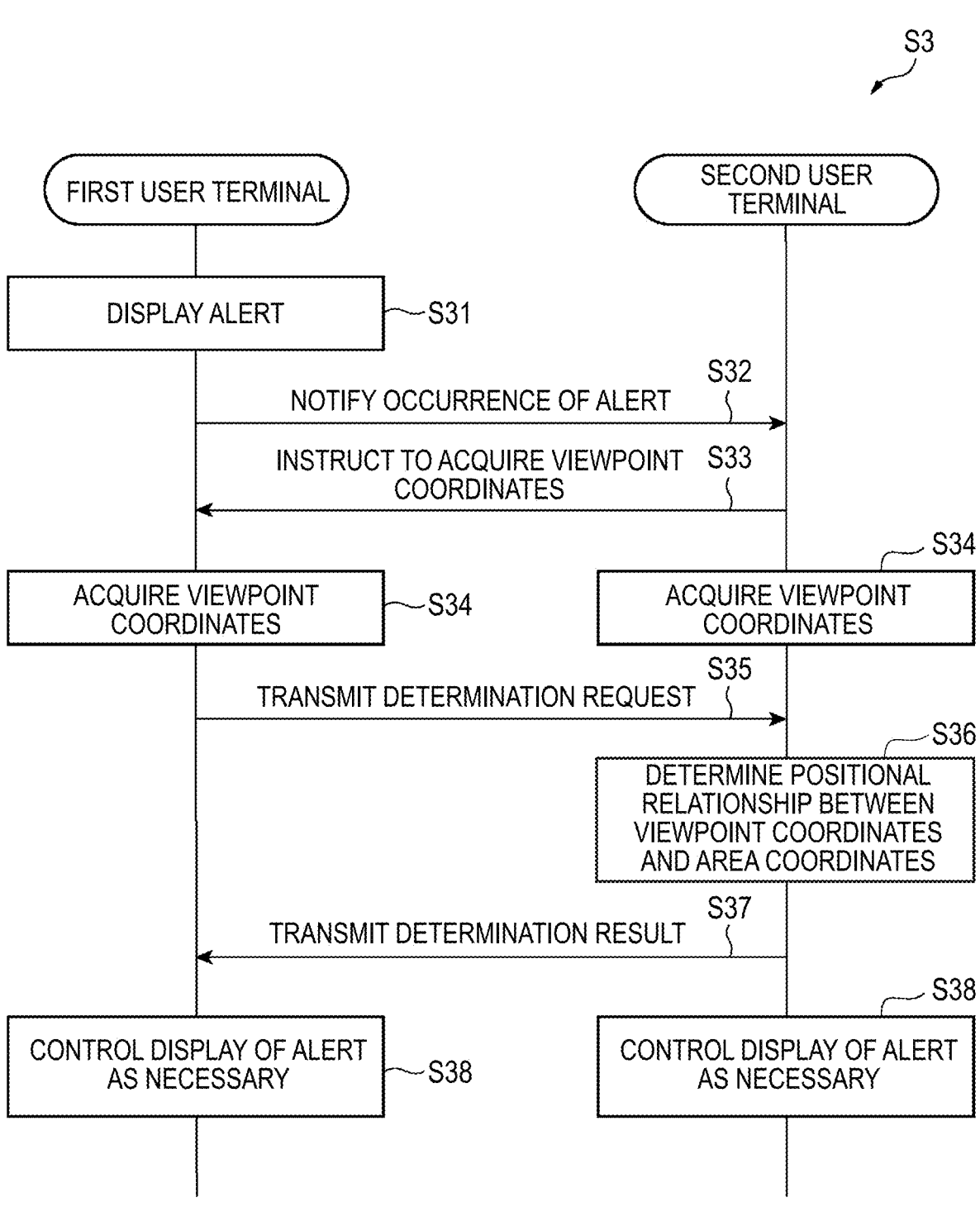
FIG. 11 is a sequence diagram illustrating a third operation example of the alert display system according to the embodiment.

FIG. 11 is a sequence diagram indicating a third operation example of the alert display system 1 as a processing flow S3. A processing flow S4 is an example of the operation of the alert display system 1 in a case where the first user terminal and the second user terminal are connected by peer to peer (P2P). Hereinafter, it will be described that the second user terminal functions as the server 10. That is, the second user terminal further includes the determination unit 11, as a functional element.

In step S31, the alert display unit 21 of the first user terminal displays the alert. The processing of step S31 is the same as the processing of the step S21 in the processing flow S2.

In step S32, the first user terminal transmits the notification of the occurrence of the alert on the first user terminal to the second user terminal. The first user terminal may transmit the notification including the area coordinates of the alert to the second user terminal. The second user terminal receives the notification of the occurrence of the alert from the first user terminal.

In step S33, the second user terminal transmits the instruction to acquire the viewpoint coordinates to the first user terminal. The first user terminal receives the instruction to acquire the viewpoint coordinates from the second user terminal.

In step S34, each of the tracking unit 22 of the first user terminal and the tracking unit 22 of the second user terminal acquires the viewpoint coordinates of the user. The processing of the step S34 is the same as the processing of step S24 in the processing flow S2.

In step S35, the enquiry unit 23 of the first user terminal transmits the determination request based on the viewpoint coordinates and the area coordinates of the alert to the second user terminal. The first user terminal may transmit the determination request including the area coordinates of the alert on the first user terminal to the second user terminal. The second user terminal receives the determination request from the first user terminal and the second user terminal.

In step S36, the determination unit 11 of the second user terminal determines the positional relationship between the viewpoint coordinates and the area coordinates of the alert. Here, the determination unit 11 determines that the viewpoint coordinates on the display device of the second user terminal are outside the predetermined range from the area coordinates of the alert on the display device of the first user terminal.

In step S37, the determination unit 11 of the second user terminal transmits the determination result to the first user terminal. For example, the determination unit 11 may transmit the determination result indicating that it is necessary to change the display form of the alert to the first user terminal. The first user terminal receives the determination result from the second user terminal.

In step S38, each of the alert control unit 24 of the first user terminal and the alert control unit 24 of the second user terminal changes the display form of the alert, as necessary. The processing of step S38 is the same as the processing of step S28 in the processing flow S2.

[Effect]

As described above, the alert display system according to one aspect of the disclosure includes at least one processor. The at least one processor displays the alert on the display device of the user terminal, detects the line of sight of the user of the user terminal, acquires the viewpoint coordinates of the user on the display device, and changes the display form of the alert on the basis of the viewpoint coordinates and the area coordinates of the alert on the display device.

The alert display method according to one aspect of the disclosure is executed by the alert display system including at least one processor. The alert display method includes a step of displaying the alert on the display device of the user terminal, a step of detecting the line of sight of the user of the user terminal, a step of acquiring the viewpoint coordinates of the user on the display device, and a step of changing the display form of the alert on the basis of the viewpoint coordinates and the area coordinates of the alert on the display device.

The alert display program according to one aspect of the disclosure allows a computer to execute a step of displaying the alert on the display device of the user terminal, a step of detecting the line of sight of the user of the user terminal, a step of acquiring the viewpoint coordinates of the user on the display device, and a step of changing the display form of the alert on the basis of the viewpoint coordinates and the area coordinates of the alert on the display device.

In such an aspect, the viewpoint coordinates of the user on the display device of the user terminal are acquired, and the display form of the alert is changed on the basis of the viewpoint coordinates and the area coordinates of the alert. That is, the display form of the alert is changed on the basis of where the user is looking on the display device, and where the alert is displayed on the display device. By the alert of which the display form is changed, it is possible to provide an environment in which the user easily notices the alert.

In an alert display system according to another aspect, at least one processor may change the display form of the alert on the basis of the fact that the viewpoint coordinates do not overlap with the area coordinates. In a case where the viewpoint coordinates do not overlap with the area coordinates, it is estimated that the user is not looking at the display of the alert. In this case, the display form of the alert is changed, and thus, it is possible to provide the environment in which the user easily notices the alert.

In the alert display system according to another aspect, at least one processor may move the alert toward the viewpoint coordinates from the display position at which the alert is displayed. The alert approaches the viewpoint coordinates of the user, and thus, it is possible to provide the environment in which the user easily notices the alert.

In the alert display system according to another aspect, at least one processor may continuously output the voice associated with the alert while the display form of the alert is changed. In this case, a possibility that the user fails to hear the voice is reduced. Accordingly, it is possible to provide the environment in which the user easily notices the alert.

In the alert display system according to another aspect, at least one processor may move the alert toward the display position set on the basis of the display position of the interface indicating the manipulation target on the display device from the initial position that is the display position at which the alert is initially displayed. The coordinates of the display position of the interface can be easily acquired, and thus, it is possible to suppress a computational cost according to the specification of a movement destination of the alert. In addition, it is estimated that the user is more likely to look at the display position of the interface, and thus, it is possible to provide the environment in which the user easily notices the alert.

In the alert display system according to another aspect, at least one processor may control whether to change the display form of the alert on the basis of the viewpoint coordinates and the area coordinates until the time set in advance elapses after the alert is initially displayed. According to such a configuration, whether to change the display form of the alert is controlled on the basis of where the user is looking on the display device, and where the alert is displayed on the display device within the time set in advance. In a case where it is estimated that the user notices the alert, it is not necessary to change the display form of the alert, and thus, it is possible to suppress the computational cost according to unnecessary processing.

In the alert display system according to another aspect, at least one processor may control whether to change the display form of the alert on the basis of the fact that the viewpoint coordinates are moved toward the area coordinates. In a case where the viewpoint coordinates are moved toward the area coordinates, it is estimated that the user notices the alert. In this case, it is not necessary to change the display form of the alert, and thus, it is possible to suppress the computational cost according to unnecessary processing.

In the alert display system according to another aspect, the display device may include the first display device and the second display device. In a case where the alert is displayed on the first display device, and the viewpoint coordinates are on the second display device, at least one processor may change the display form of the alert. In a case where the user is looking at the second display device, it is difficult for the user to notice the alert displayed on the first display device. In this case, by changing the display form of the alert, it is possible to provide the environment in which the user easily notices the alert.

Subsequently, an example of the application of an alert display system 1A according to another embodiment will be described. FIG. 12 is a diagram illustrating an example of a functional configuration relevant to the alert display system 1A. The alert display system 1A is different from the alert display system 1 in that the initial position of the alert is determined on the basis of the viewpoint coordinates. Hereinafter, for the alert display system 1A, a difference from the alert display system 1 will be mainly described. A server 10A includes a determination unit 11A, as a functional element. The determination unit 11A is a functional element determining the display position of the alert.

A user terminal 20A includes an event detection unit 25, the tracking unit 22, an enquiry unit 23A, and an alert display unit 21A, as a functional element. The event detection unit 25 is a functional element detecting the event associated with the alert. The enquiry unit 23A is a functional element transmitting the determination request of the display position of the alert based on the viewpoint coordinates to the server 10A. The alert display unit 21A is a functional element displaying the alert at a display position set on the basis of the viewpoint coordinates.

Figure 13:
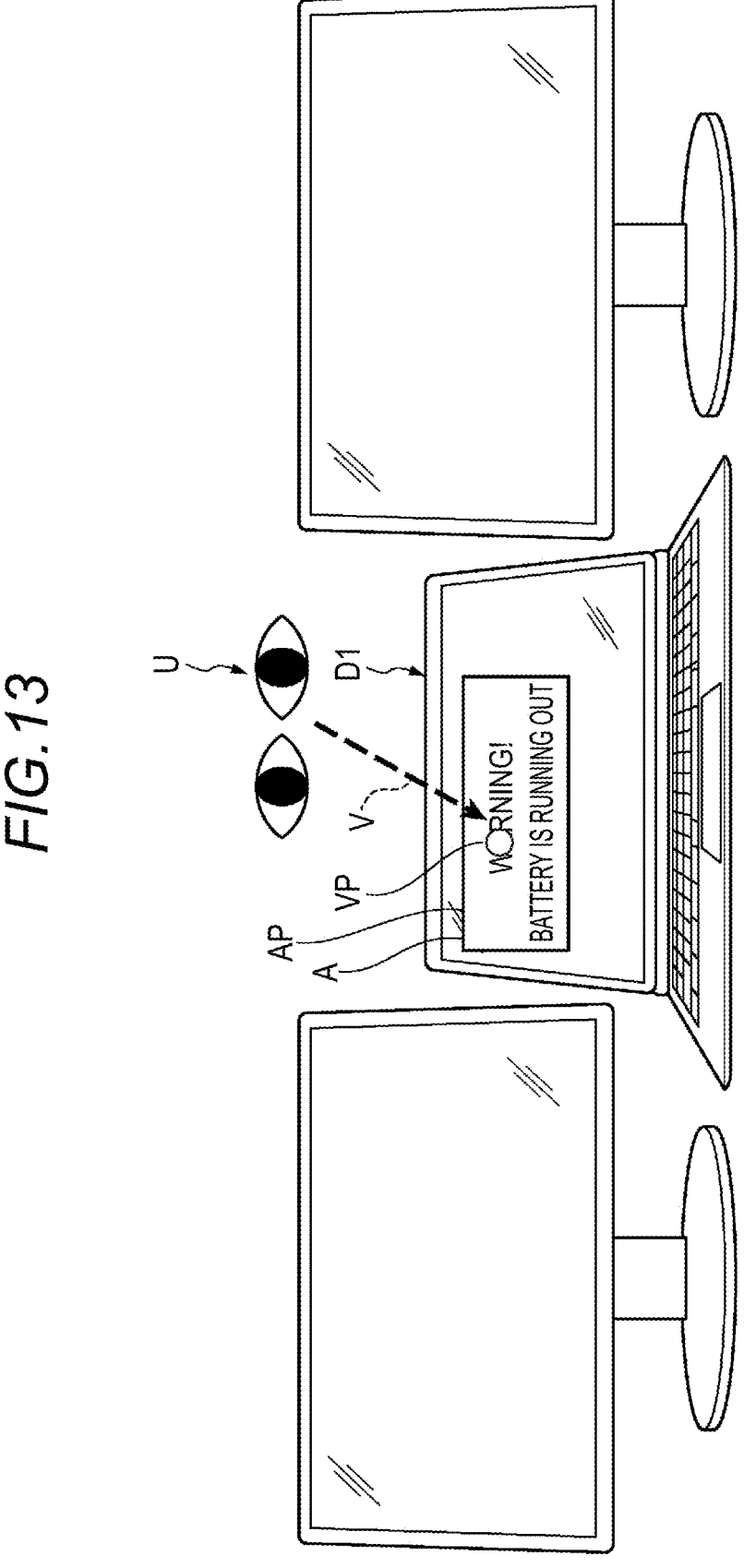
FIG. 13 is a diagram illustrating an example of display of the alert.

FIG. 13 is a diagram illustrating an example of the display of the alert. The tracking unit 22 detects the line V of sight of the user U, and acquires the viewpoint coordinates VP of the user U. In an example, the viewpoint coordinates VP of the user U are on the display device D1. The enquiry unit 23A transmits the determination request of the display position of the alert based on the viewpoint coordinates VP to the server 10A. The determination unit 11A of the server 10A determines the display position based on the viewpoint coordinates VP. The display position based on the viewpoint coordinates VP may be a given range centered on the viewpoint coordinates VP, and for example, may be a rectangular range centered on the viewpoint coordinates VP, but is not limited thereto. The determination unit 11A transmits the determination result to the user terminal 20A. The alert display unit 21A displays the alert A on the basis of the determination result. For example, the alert display unit 21A displays the alert A at the display position set on the basis of the viewpoint coordinates VP. The alert display unit 21A may display the alert A such that the area coordinates AP of the alert A and the viewpoint coordinates VP overlap with each other, or may display the alert A such that the area coordinates AP of the alert A and the viewpoint coordinates VP do not overlap with each other.

Figure 14:
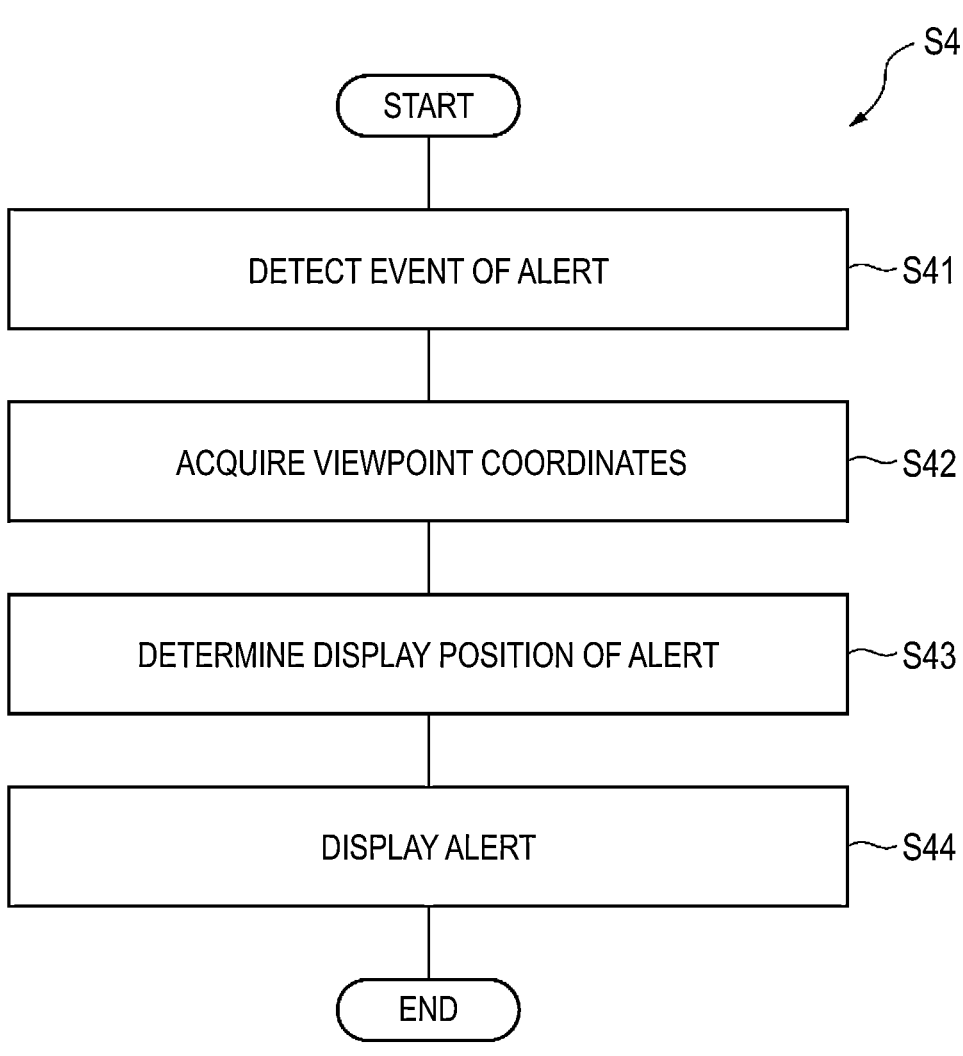
FIG. 14 is a flowchart illustrating a first operation example of the alert display system according to another embodiment.

FIG. 14 is a flowchart illustrating a first operation example of the alert display system 1A as a processing flow S4.

In step S41, the event detection unit 25 of the user terminal 20A detects the event of the alert. For example, the event detection unit 25 detects the event that occurs on the operating system or the application system of the user terminal 20A. The event detection unit 25, for example, may detect the event that occurs on the Web application.

In step S42, the tracking unit 22 of the user terminal 20A acquires the viewpoint coordinates of the user. The processing of step S42 is the same as the processing of step S12 in the processing flow S1.

In step S43, the enquiry unit 23A of the user terminal 20A transmits the determination request of the display position of the alert based on the viewpoint coordinates to the server 10A. Then, the determination unit 11A of the server 10A determines the display position based on the viewpoint coordinates. The determination unit 11A transmits the determination result to the user terminal 20A.

In step S44, the alert display unit 21A of the user terminal 20A displays the alert on the basis of the determination result. For example, the alert display unit 21A displays the alert at the display position set on the basis of the viewpoint coordinates.

Figure 15:
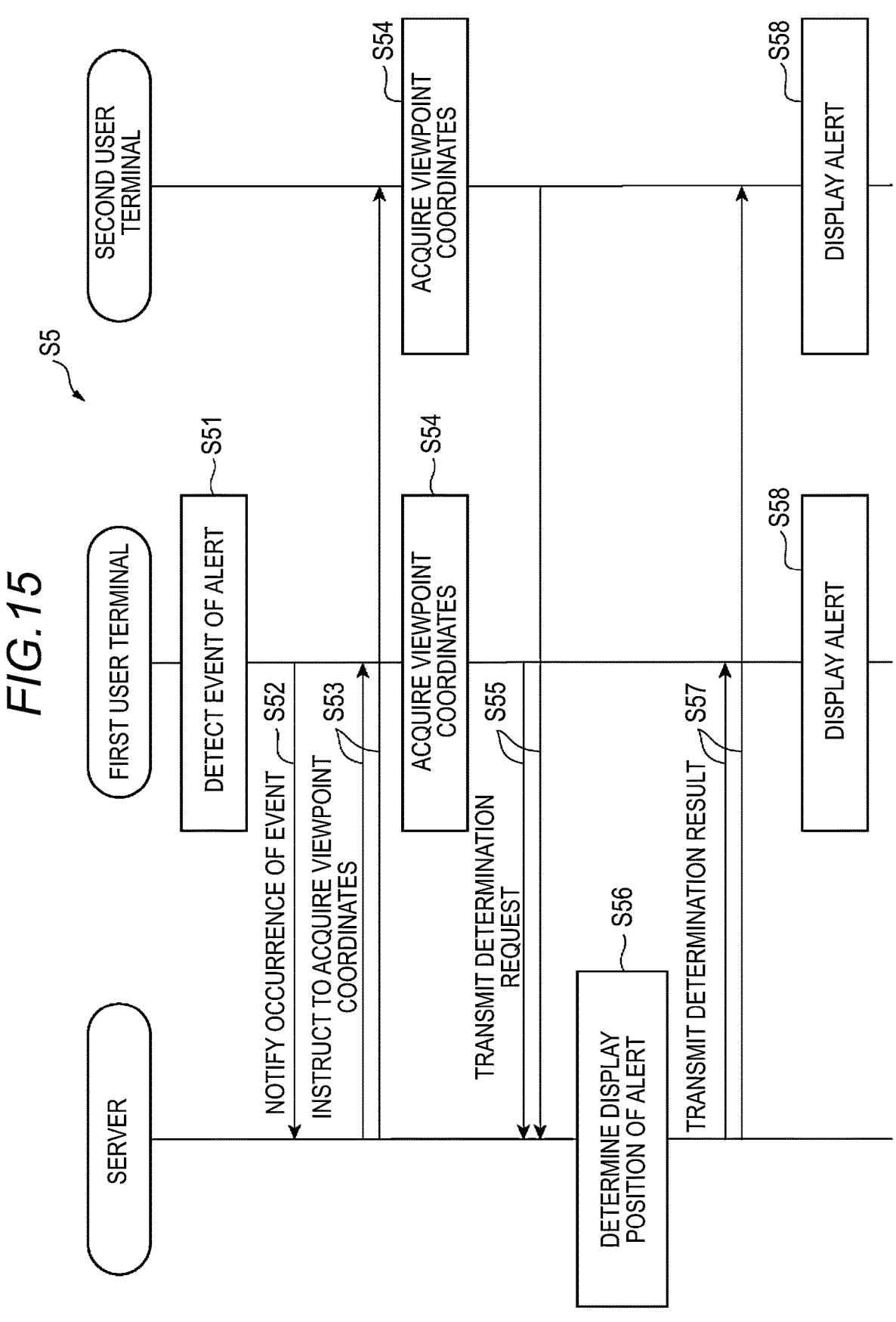
FIG. 15 is a sequence diagram illustrating a second operation example of the alert display system according to another embodiment.

FIG. 15 is a sequence diagram illustrating a second operation example of the alert display system 1A as a processing flow S5. The processing flow S5 is an example of the operation of the alert display system 1A in a case where the user terminal 20A includes the first user terminal and the second user terminal.

In step S51, the event detection unit 25 of the first user terminal detects the alert. For example, the event detection unit 25 of the first user terminal detects the event that occurs on the operating system or the application system of the first user terminal. The event detection unit 25 of the first user terminal, for example, may detect the event that occurs on the Web application.

In step S52, the first user terminal transmits the notification of the occurrence of the alert on the first user terminal to the server 10A. The first user terminal may transmit the notification including the area coordinates of the alert to the server 10A. The server 10A receives the notification of the occurrence of the alert from the first user terminal.

In step S53, the server 10A transmits the instruction to acquire the viewpoint coordinates to the first user terminal and the second user terminal. Each of the first user terminal and the second user terminal receives the instruction to acquire the viewpoint coordinates from the server 10A.

In step S54, each of the tracking unit 22 of the first user terminal and the tracking unit 22 of the second user terminal acquires the viewpoint coordinates of the user. Here, it is described that the user is directing the line of sight toward the display device of the second user terminal. That is, the viewpoint coordinates of the user are not on the display device of the first user terminal but on the display device of the second user terminal.

In step S55, the enquiry unit 23A of the first user terminal and the enquiry unit 23A of the second user terminal transmit the determination request of the display position of the alert based on the viewpoint coordinates to the server 10A. The first user terminal may transmit the determination request including the area coordinates of the alert on the first user terminal to the server 10A. The server 10A receives the determination request from the first user terminal and the second user terminal.

In step S56, the determination unit 11A of the server 10A determines the display position of the alert. For example, the determination unit 11A determines the display position based on the viewpoint coordinates.

In step S57, the determination unit 11A transmits the determination result to the first user terminal and the second user terminal. Each of the first user terminal and the second user terminal receives the determination result from the server 10A.

In step S58, each of the alert display unit 21A of the first user terminal and the alert display unit 21A of the second user terminal displays the alert, as necessary. For example, the alert display unit 21A of the first user terminal displays the alert at the display position set on the basis of the viewpoint coordinates. The alert display unit 21A of the second user terminal does not perform the processing.

Figure 16:
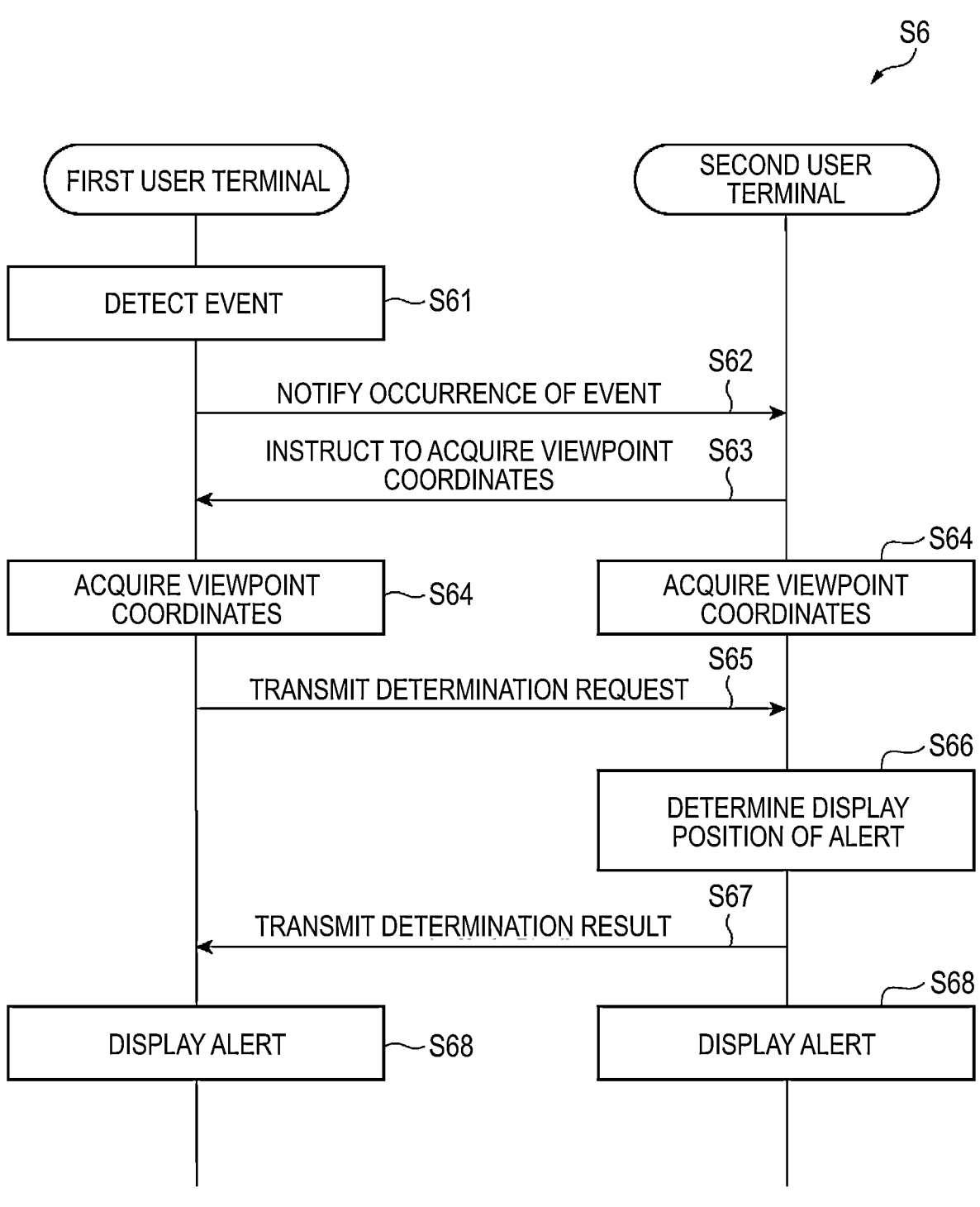
FIG. 16 is a sequence diagram illustrating a third operation example of the alert display system according to another embodiment.

FIG. 16 is a sequence diagram illustrating a third operation example of the alert display system 1A as a processing flow S6. The processing flow S6 is an example of the operation of the alert display system 1A in a case where the first user terminal and the second user terminal are connected by peer to peer (P2P). Hereinafter, it will be described that the second user terminal functions as the server 10A. That is, the second user terminal further includes the determination unit 11A, as a functional element.

In step S61, the event detection unit 25 of the first user terminal detects the alert. The processing of step S61 is the same as the processing of step S51 in the processing flow S5.

In step S62, the first user terminal transmits the notification of the occurrence of the alert on the first user terminal to the second user terminal. The first user terminal may transmit the notification including the area coordinates of the alert to the second user terminal. The second user terminal receives the notification of the occurrence of the alert from the first user terminal.

In step S63, the second user terminal transmits the instruction to acquire the viewpoint coordinates to the first user terminal. The first user terminal receives the instruction to acquire the viewpoint coordinates from the second user terminal.

In step S64, each of the tracking unit 22 of the first user terminal and the tracking unit 22 of the second user terminal acquires the viewpoint coordinates of the user. The processing of step S64 is the same as the processing of step S54 in the processing flow S5.

In step S65, the enquiry unit 23 of the first user terminal transmits the determination request based on the viewpoint coordinates and the area coordinates of the alert to the second user terminal. The first user terminal may transmit the determination request including the area coordinates of the alert on the first user terminal to the second user terminal.

The second user terminal receives the determination request from the first user terminal and the second user terminal.

In step S66, the determination unit 11 of the second user terminal determines the display position of the alert. For example, the determination unit 11A determines the display position based on the viewpoint coordinates.

In step S67, the determination unit 11 of the second user terminal transmits the determination result to the first user terminal. For example, the determination unit 11 may transmit the determination result indicating that it is necessary to change the display form of the alert to the first user terminal. The first user terminal receives the determination result from the second user terminal.

In step S68, each of the alert display unit 21A of the first user terminal and the alert display unit 21A of the second user terminal displays the alert, as necessary. The processing of step S68 is the same as the processing of step S58 in the processing flow S5.

[Effect]

The alert display system according to one aspect of the disclosure includes at least one processor. At least one processor detects the line of sight of the user of the user terminal, acquires the viewpoint coordinates of the user on the display device of the user terminal, and displays the alert at the display position set on the basis of the viewpoint coordinates. According to such a configuration, the alert is displayed close to where the user is looking, and thus, it is possible to provide the environment in which the user easily notices the alert.

Modification Example

The detailed description has been made on the basis of the embodiment of the disclosure. However, the disclosure is not limited to the embodiment described above. The disclosure can be variously modified within a range not departing from the gist thereof.

In the embodiment described above, a case where the viewpoint coordinates of the user are on the display device of the user terminal 20 will be described, but the viewpoint coordinates may be outside the display device. For example, the tracking unit 22 may detect the line of sight of the user that is directed toward the outside of the display device of the user terminal 20. That is, the tracking unit 22 may acquire the viewpoint coordinates indicating that the user is not looking at the display device of the user terminal 20. For example, in a case where the viewpoint coordinates are outside the display device, the alert control unit 24 may continuously output the voice associated with the alert. According to such a configuration, it is also possible to provide the environment in which the user easily notices the alert.

In the alert of the related art, the predetermined sound is output together with the display of the alert. In contrast, the alert display system 1 may control whether to output the predetermined sound. For example, the alert display unit 21 may control such that the alert is displayed, but the predetermined sound is not output. The tracking unit 22 may acquire the trajectory of the viewpoint within the time set in advance after the alert is initially displayed. The enquiry unit 23 may transmit the determination request based on the trajectory of the viewpoint and the area coordinates of the alert to the server 10. The determination unit 11 may determine whether the trajectory of the viewpoint is within the predetermined range from the area coordinates of the alert, and may transmit the determination result to the user terminal 20. The alert control unit 24 may control whether to output the voice associated with the alert on the basis of the trajectory of the viewpoint and the area coordinates. For example, in a case where it is determined that there are one or a plurality of viewpoint coordinates overlapping with the area coordinates of the alert, the alert control unit 24 does not output the predetermined sound of the alert. In a case where it is determined that there are not one or a plurality of viewpoint coordinates overlapping with the area coordinates of the alert, the alert control unit 24 outputs the predetermined sound of the alert. According to such a configuration, in a case where it is estimated that the user notices the alert within the predetermined time after the alert is displayed, the predetermined sound of the alert is not output. By suppressing the predetermined sound of unnecessary alert only with the line of sight, user-friendliness is improved. In an example, in a state where the voice output of the user terminal 20 is not muted such as during a Web conference or the like, the user can control such that the predetermined sound of the alert is not produced only with the line of sight.

In the embodiment described above, a case where one alert is displayed on the display device of the user terminal has been described, but a plurality of alerts may be displayed. In this case, the alert control unit 24 may change the plurality of alerts to different display forms, respectively. In addition, the alert control unit 24 may change the display form in accordance with the elapsed time after the alert is displayed. For example, the alert control unit 24 may change the display form in ascending or descending order according to the elapsed time. In another example, the alert control unit 24 may display the alert displayed on only one display device among the plurality of display devices, on another display device. Further, in another example, the alert control unit 24 may combine the change of a plurality of types of display forms for one alert. According to such a configuration, it is also possible to provide the environment in which the user easily notices the alert.

In the disclosure, the expression of "at least one processor executes the first processing, executes the second processing, . . . , and executes the n-th processing", or the expression corresponding thereto is a concept including a case where a subject (that is, a processor) for executing n processing pieces from the first processing to the n-th processing is changed in the middle. That is, the expression is a concept including both of a case where all of n processing pieces are executed by the same processor and a case where in n processing pieces, the processor is changed in accordance with any policy.

The processing procedure of the method executed by at least one processor is not limited to an example in the embodiment described above. For example, a part of the steps (the processing pieces) described above may be omitted, or each of the steps may be executed in another order. In addition, any two or more steps among the steps described above may be combined, or a part of the steps may be corrected or deleted. Alternatively, other steps may be executed in addition to each of the steps described above.

Any part or all of the functional units described in this specification may be attained by a program. The program mentioned in this specification may be distributed by being non-transitorily recorded in a computer-readable recording medium, may be distributed through a communication line (also including wireless communication) such as the internet, or may be distributed in the state of being installed in any terminal.

On the basis of the above description, a person skilled in the art may conceive additional effects or various modification examples with respect to the disclosure, but the aspect of the disclosure is not limited to each of the embodiments described above. Various additions, changes, and partial deletions can be made without departing from the conceptual idea and the gist of the disclosure derived from the content defined in the claims and equivalents thereof.

For example, in this specification, a configuration (including a configuration drawn as one device in the drawings) described as one device (or member, the same applies to the following) may be attained by a plurality of devices. Alternatively, in this specification, a configuration (including a configuration drawn as a plurality of devices in the drawings) described as a plurality of devices may be attained by one device. Alternatively, a part or all of the units or the functions included in a certain device (for example, a server) may be included in another device (for example, a user terminal).

Not all respects described in this specification are integral aspects. For example, the respects described in this specification but not described in the claims can be referred to as any additional respect.

The applicant is only aware of the known technologies described in the section of "Citation List" of this specification. It should also be noted that the disclosure is not necessarily intended to solve the problems in the related art. The problem to be solved in the disclosure should be determined by considering the entire specification. For example, in this specification, in a case where there is a statement that a predetermined effect is attained by a specific configuration, it can also be said that the problem corresponding to the predetermined effect is solved. However, the description relevant to the effect does not necessarily mean that such a specific configuration is an integral aspect.

REFERENCE SIGNS LIST

1, 1A: alert display system
10, 10A: server
11, 11A: determination unit
20, 20A: user terminal
21, 21A: alert display unit
22: tracking unit
23, 23A: enquiry unit
24: alert control unit
25: event detection unit
P1: server program
P2: client program

The invention claimed is:

1. An alert display system comprising
at least one processor,
wherein the at least one processor displays an alert on a
display device of a user terminal,
detects a line of sight of a user of the user terminal
based on eye movement of the user, and acquires
viewpoint coordinates of the user, which correspond
to the line of sight of the user, on the display device,
changes a display form of the alert based on the
viewpoint coordinates and area coordinates of the
alert on the display device,
moves the alert toward the viewpoint coordinates from
a display position at which the alert is initially
displayed; and
moves the alert toward a display position based on a
display position of an interface indicating a manipulation target on the display device;
wherein the manipulation target indicates a target configured to accept one or more inputs from an operation of
the user.

2. The alert display system according to claim 1, wherein the at least one processor changes the display form of the alert based on a fact that the viewpoint coordinates do not overlap with the area coordinates.

3. The alert display system according to claim 1, wherein the at least one processor continuously outputs a voice associated with the alert while changing the display form of the alert.

4. The alert display system according to claim 1, wherein the at least one processor controls whether to change the display form of the alert based on the viewpoint coordinates and the area coordinates until a time set in advance elapses after the alert is initially displayed.

5. The alert display system according to claim 1, wherein the at least one processor controls whether to change the display form of the alert based on a fact that the viewpoint coordinates are moved toward the area coordinates.

6. The alert display system according to claim 1, wherein the display device includes a first display device and a second display device, and the at least one processor displays the alert on the first display device, and changes the display form of the alert when the viewpoint coordinates are on the second display device.

7. The alert display system according to claim 1, wherein the interface indicating the manipulation target is a mouse cursor.

8. The alert display system according to claim 1, wherein the alert is one of an alert relevant to an event that occurs on an operating system or application system of the user terminal.

9. The alert display system according to claim 1, wherein the alert is an alert relevant to an event that occurs on a web application on the display device.

10. An alert display system comprising
at least one processor,
wherein the at least one processor
detects a line of sight of a user of a user terminal, and acquires viewpoint coordinates of the user, which correspond to the line of sight of the user, on a display device of the user terminal,
displays an alert at a display position set based on the viewpoint coordinates, and
moves the alert toward the viewpoint coordinates from a display position at which the alert is initially displayed; and moves the alert toward a display position based on a display position of an interface indicating a manipulation target on the display device;
wherein the manipulation target indicates a target configured to accept one or more inputs from an operation of the user.

11. An alert display method executed by an alert display system including at least one processor, the method comprising:
a step of displaying an alert on a display device of a user terminal;
a step of detecting a line of sight of a user of the user terminal based on eye movement of the user, and acquiring viewpoint coordinates of the user, which correspond to the line of sight of the user, on the display device;
a step of changing a display form of the alert based on the viewpoint coordinates and area coordinates of the alert on the display device, and
a step of moving the alert toward the viewpoint coordinates from a display position at which the alert is initially displayed;
a step of moving the alert toward a display position based on a display position of an interface indicating a manipulation target on the display device;
wherein the manipulation target indicates a target configured to accept one or more inputs from an operation of the user.

12. A non-transitory computer-readable storage medium storing a program allowing a computer to execute:
a step of displaying an alert on a display device of a user terminal;
a step of detecting a line of sight of a user of the user terminal based on eye movement of the user, and acquiring viewpoint coordinates of the user, which correspond to the line of sight of the user, on the display device;
a step of changing a display form of the alert based on the viewpoint coordinates and area coordinates of the alert on the display device, and
a step of moving the alert toward the viewpoint coordinates from a display position at which the alert is initially displayed;
a step of moving the alert toward a display position based on a display position of an interface indicating a manipulation target on the display device;
wherein the manipulation target indicates a target configured to accept one or more inputs from an operation of the user.

* * * * *